United States Patent [19]
Firey

[11] Patent Number: 5,193,338
[45] Date of Patent: Mar. 16, 1993

[54] CYCLIC CHAR FUEL OXIDATION REACTORS WITH OPPOSED CROSS FLOW PRIMARY REACTORS

[76] Inventor: Joseph C. Firey, P.O. Box 15514, Seattle, Wash. 98115-0514

[21] Appl. No.: 848,545

[22] Filed: Mar. 9, 1992

Related U.S. Application Data

[63] Continuation-in-part of Ser. No. 731,208, Jul. 15, 1991.

[51] Int. Cl.[5] .............................................. F02C 3/28
[52] U.S. Cl. .................... 60/39.12; 60/39.464
[58] Field of Search ............... 60/39.02, 39.04, 39.12, 60/39.17, 39.464

[56] References Cited

U.S. PATENT DOCUMENTS

| | | | |
|---|---|---|---|
| 2,488,969 | 11/1949 | Dietler | 60/39.12 |
| 2,672,012 | 3/1954 | Vernon | 60/39.464 |
| 4,509,957 | 4/1985 | Firey | 60/39.12 |
| 4,692,171 | 9/1987 | Firey | 60/39.17 |
| 4,698,069 | 10/1987 | Firey | 60/39.12 |
| 4,889,539 | 12/1989 | Firey | 60/39.17 |

Primary Examiner—Louis J. Casaregola

[57] ABSTRACT

Reacted gas reservoirs and reactant gas manifolds are added to the primary reactors of cyclic char fuel oxidation reactor plants in order to create a flow of gas across the direction of motion of the solid char fuel. Preferably this cross flow direction through the rapid reaction zone is opposite to that through the volatile matter distillation zone. A larger and more stable rapid char fuel primary reaction zone can be created with this cross flow, and separation and improved utilization of char fuel volatile matter can be achieved.

21 Claims, 11 Drawing Sheets

CYCLIC CHAR FUEL OXIDATION REACTORS WITH OPPOSED CROSS FLOW PRIMARY REACTORS

CROSS REFERENCES TO RELATED APPLICATIONS

This application is a continuation in part of my earlier filed U.S. patent application entitled, Cyclic Char Fuel Oxidation Reactors with Cross Flow Primary Reactors, Ser. No. 07/731,208, filed Jul. 15, 1991 (allowed).

The invention described herein is related to my following U.S. patent applications:
1. Cross Flow Primary Reactors for Cyclic Char Burning Engines and Gasifiers, Ser. No. 07/725,823, filed Jul. 3, 1991, now standing allowed with issue fee paid, but not issued.
2. Cross Flow Char Fuel Gas Producers, Ser. No. 07/774,608, filed Oct. 10, 1991.
3. Opposed Cross Flow Primary Reactors for Cyclic Char Burning Engines and Gasifiers, Ser. No. 07/823,479, filed Jan. 21, 1992.

BACKGROUND OF THE INVENTION

1. Field of the Invention

This invention is in the field of cyclic char fuel oxidation reactor plants wherein several char fuel masses within several separate primary reactors are first compressed with reactant air from a separate compressor followed by expansion of resulting reacted gas into a separate expander and this cycle of compression followed by expansion is repeated.

2. Description of the Prior Art

The following U.S. patents describe several example types of cyclic char fuel oxidation reactor plant with which the improvements of this invention can be used:
U.S. Pat. No. 4,455,837; J. C. Firey, Jun. 26, 1984
U.S. Pat. No. 4,484,531; J. C. Firey, Nov. 27, 1984
U.S. Pat. No. 4,509,957; J. C. Firey, Apr. 9, 1985
U.S. Pat. No. 4,568,361; J. C. Firey, Feb. 4, 1986
U.S. Pat. No. 4,707,991; J. C. Firey, Nov. 24, 1987

In all of these example cyclic char fuel oxidation reactor plants the gaseous reactants, such as air, are compressed into the pore spaces of the char fuel contained within several primary reactors inside pressure vessel containers. Primary reaction of the gaseous reactants with the char fuel occurs within the pore spaces during compression. Expansion of these primary product gases then occurs out of the pore spaces of the char fuel. In some forms of cyclic char fuel oxidation reactor plant the primary product gases are further reacted with additional reactant gases in a secondary reaction within a secondary reaction chamber during expansion. This cycle of gas compression followed by expansion is repeated for each of the pressure vessel containers, with fresh gaseous reactants being supplied for each compression and with final product reacted gases being removed during each expansion. The descriptions of cyclic char fuel oxidation reactor plants contained in the above listed U.S. patents are incorporated herein by reference thereto. The compressors of these plants are separate from the expanders thereof, but may be driven thereby, as for example where a centrifugal compressor is driven via its input shaft by the output shaft of a gas turbine engine expander.

Several char fuel containers are used on these cyclic char fuel oxidation reactor plants and these are pressure vessel containers whose number at least equals the sum of the number of compressor stages plus the number of expander stages. Each of these containers is fitted with a refuel means for adding char fuel into the refuel end of the primary reactor and an ash removal means for removing ashes or spent char fuel material from the ash removal end of the primary reactor.

The compressor means of these cyclic char fuel reaction plants comprise one or more stages, as defined in the material incorporated by reference, and each such stage has a delivery end outlet at its high pressure end through which the compressed gas may flow out of a stage and into a connected char fuel container. The expander means of these cyclic char fuel reaction plants may be a work producing engine and comprise one or more stages, as defined in the material incorporated by reference, and each such stage has an inlet at its high pressure end through which the reacted gas may flow into the expander stage from the connected char fuel container. The expander can be a simple blow down expander of low cost. But in many cyclic char fuel oxidation reactor plants we will prefer to use an expander engine, such as a gas turbine in order to recover the available work of expansion. This expander engine work can be used to drive the compressor and to generate output work via a means for absorbing expander work such as an electric generator.

Each container has separate changeable gas flow connections to each delivery end outlet of each compressor stage and to each inlet of each expander stage and these changeable gas flow connections comprise means for opening and closing these connections while the plant is operating. These several means for opening and closing are controlled by a means for controlling the opening and closing of the changeable gas flow connections so that:

1. Each container is opened for a time period to each outlet of each stage of the compressor, in a sub sequence of time periods of open gas flow connections to compressor stage outlets, proceeding in time order of increasing compressor stage delivery pressure.
2. Each container is opened for a time period to each inlet of each stage of the expander, in a sub sequence of time periods of open gas flow connections to expander stage inlets, proceeding in time order of decreasing expander stage inlet pressure.
3. A sub sequence of gas flow connections to expander stage inlets follows after each sub sequence of gas flow connections to compressor stage outlets, and these sub sequences are repeated.
4. During any one time period of these sub sequences of connections each container is open gas flow connected to but one stage of either the compressor or the expander.
5. During any one time period of these sub sequences of connections each stage is open gas flow connected to but one container.

Additional detailed descriptions of char fuel containers and changeable gas flow connections are presented in the material incorporated by reference, for example in U.S. Pat. No. 4,509,957, col. 14, line 46 through line 58, and col. 18, line 39 through line 52.

As used herein and in the claims the term char fuel is as defined in U.S. Pat. No. 4,509,957, col. 2, line 58 through 68, and in U.S. Pat. No. 4,455,837, col. 4, line 8 through line 16, and this material is incorporated herein by reference.

A means for preheating the char fuel within the primary reaction chamber is used to bring the char fuel up to that temperature at which it will react rapidly with oxygen in adjacent compressed gases while the plant is being started. Thereafter the means for preheating the char fuel can be turned off when the heat of the primary reaction becomes sufficient to keep the char fuel at or above this rapid reaction temperature. During starting a cranking means is used to drive the compressor.

As char fuel is reacted to ashes within the primary reactor it is replaced by a refuel mechanism means for supplying fresh char fuel into a refuel end of the primary reactor. The char fuel is thus moved along through the primary reactor toward an opposite ash collection end of the primary reactor. Hence the char fuel being reacted within the primary reactor has a direction of motion from the refuel end toward the ash collection end. An ash removal mechanism is used as a means for removing ashes from the primary reaction chamber.

Where air is the reactant gas it is readily available from the atmosphere. In some applications oxygen enriched air or essentially pure oxygen may be used as the reactant gas, as for example in some gasifier uses, and here a source of oxygen rich gas is needed.

The term producer gas is used herein and in the claims to mean those reacted gases emerging from the rapid reaction zone of the primary reactor during expansion and this is normally a fuel gas containing carbon monoxide and other components.

The term fixed open gas flow connection is used herein and in the claims to mean a gas flow passage which remains open whenever the cyclic char fuel oxidation reactor is operating.

The term changeable gas flow connection is used herein and in the claims to mean a gas flow passage which can be opened or closed while the cyclic char fuel oxidation reactor plant is operating. A changeable gas flow connection is opened and closed by a means for opening and closing.

As the char fuel within the primary reactor moves along the char fuel motion direction, it is preheated by heat transfer from char fuel portions which are further along and are reacting rapidly with oxygen and thus are at a high temperature. Where the char fuel being used is essentially free of volatile matter, as with coke fuel, this preheat zone serves to bring the new char fuel up to its rapid reaction temperature. The char fuel then enters the rapid reaction zone and carbon reacts therein with oxygen to form producer gas. Beyond the rapid reaction zone in the direction of char fuel motion the char fuel is essentially completely reacted to ashes which pass into an ash collection zone at the end of the char fuel motion path.

When the char fuel being used contains volatile matter, as with bituminous coal, the preheat zone also serves to remove the volatile matter from the coal, in part by distillation and in part by reaction to volatile products. In the absence of oxygen, appreciable portions of this distilled volatile matter become tars and other portions become fuel gases of essentially hydrocarbon type. These tars from coal volatile matter are undesirable in a cyclic char fuel oxidation reactor as they tend to clog up the mechanical components of the expander and to foul any spark igniters used in the secondary reactor. Tars which are exhausted from the cyclic char fuel oxidation reactor plant are also an undesirable pollutant material.

In prior art, steady pressure, gas producers tar formation from coal volatile matter has been successfully reduced by passing the primary reactant air first into the preheat and volatile matter distillation zone. The emerging volatile matter apparently reacts with oxygen in the air to form oxygenated hydrocarbon type materials which form much less tar. The resulting volatile matter in air mixture then passes into the rapid reaction zone. Within the rapid reaction zone the volatile matter in air mixture is apparently burned in appreciable part to fully reacted carbon dioxide and steam. The carbon dioxide and steam, plus any unreacted oxygen, then react with carbon in the rapid reaction zone to form producer gas which emerges from the primary reactor. One disadvantage of this method for reducing tar formation is that the initial burning of the volatile matter in air mixture on entering the rapid reaction zone creates very high temperatures there and ash fusion and clinkering may result. These clinkers clog up the motion of the char fuel along the char fuel motion direction and may encase carbon particles and thus prevent complete carbon gasification. Another disadvantage of this method for reducing tar formation is that the carbon dioxide and steam created by burnup of the volatile matter in air mixture, react much more slowly with hot carbon in the rapid reaction zone to form producer gas. In prior art, steady pressure, gas producers this latter disadvantage was overcome by use of deeper rapid reaction zones of larger cross sectional area so that the required producer gas reaction could be completed. But when primary producer gas reactors are to be used on cyclic char fuel oxidation reactor plants such large volume reactors are undesirable since very thick walls are needed on the pressure vessel containers. It would be very desirable to have available a method for reducing tar formation from high volatile matter char fuels which did not produce clinkers and did not require a large volume primary reactor.

SUMMARY OF THE INVENTION

Within all the primary reactors of a cyclic char fuel oxidation reactor the reactant air is caused to flow across the direction of motion of the char fuel.

A first air manifold is added with first reactant gas inlet ports along a first side of each primary reactor and along that portion of the length of the char fuel motion path adjacent to the rapid reaction zone. A producer gas reservoir is added with producer gas outlet ports on the opposite side of each primary reactor from the first inlet ports of the first air manifold and these producer gas ports positioned along that portion of the length of the char fuel motion path adjacent to the rapid reaction zone. During compression reactant air thus flows from the first air manifold, through the rapid reaction zone, in a first direction across the char fuel motion direction, and into the producer gas reservoir where the resulting producer gas is stored during compression.

A second air manifold is added with second reactant gas inlet ports along a second side of each primary reactor and along that portion of the length of the char fuel motion path adjacent to the char fuel preheat and volatile matter distillation zone. A volatile matter in air mixture reservoir is added with volatile matter in air mixture outlet ports on the opposite side of each primary reactor from the second inlet ports of the second air manifold and these volatile matter in air mixture ports positioned along that portion of the length of the char fuel motion path adjacent to the volatile matter distillation zone. During compression reactant air thus flows from the second air manifold through the char fuel preheat and volatile matter distillation zone, in a second direction across the char fuel motion direction, and into the volatile matter in air mixture reservoir where the resulting volatile matter in air mixture is stored during compression.

With these two separate reactant gas manifolds a different reactant gas can be used in the rapid reaction zone than is used in the volatile matter distillation zone. In some applications of cyclic char fuel oxidation reactors steam is utilized in the rapid reaction zone to increase the volumetric heating value of the resultant producer gas or to reduce the char fuel temperature in the rapid reaction zone below the ash fusion temperature. With the separate reactant gas manifolds of this invention steam can be thusly introduced into only the rapid reaction zone and steam assuredly need not be wasted by adding it needlessly into the volatile matter distillation zone. Similar economies of use can also be achieved by use of the two separate reactant gas manifolds of this invention when oxygen enrichment of the reactant gas flowing into the rapid reaction zone is utilized to increase the volumetric heating value of the resultant producer gas. These are among the beneficial objects of this invention.

The first side of the primary reactor is preferably opposite the second side of the primary reactor so that the first direction of gas flow across the char fuel motion direction is essentially opposite to the second direction of gas flow across the char fuel motion direction. In this way the heat transfer from the high temperature rapid reaction zone into the volatile matter distillation and char fuel preheat zone takes place under preferred gas counterflow conditions. It is necessary to thusly transfer heat from the rapid reaction zone into the volatile matter distillation and char preheat zone in order to both preheat the char fuel up to its rapid reaction temperature and to evaporate the volatile matter of the char fuel. Thus another beneficial object of this preferred form of the invention is the increased heat quantity transferable by use of counterflow of the gases between which heat is being transferred.

During expansion the stored producer gas can reverse flow direction and flow out via the rapid reaction zone into the first air manifold and thence into the separate expander. Alternatively changeable gas flow connections can be used between each producer gas reservoir and the separate expander so that producer gas flows wholly or partially unidirectionally into the expander during expansion and may not all reverse flow direction. Additional changeable gas flow connections can be used between separate compressor and each first air manifold so that gas flow through the first air manifold, the primary reaction chamber, and the producer gas reservoir, is essentially wholly unidirectional during both compression and expansion.

As described above for the producer gas reservoir the flow of the volatile matter in air mixture out of its reservoir during expansion can also be unidirectional, in whole or part, by use of changeable gas flow connections, or can be reversed when such changeable gas flow connections are not used.

Tar reduction by mixing air into emerging coal volatile matter can be achieved by use of this invention without appreciable burnup of the volatile matter in air mixture since this mixture passes largely into the volatile matter in air reservoir and only small portions may enter the high temperature rapid reaction zone. In this way carbon dioxide formation is avoided and an excessively large primary reaction chamber is not required. Also excessive temperatures from burnup of volatile matter in air mixture and consequent ash fusion with clinker formation are also avoided. These are among the beneficial objects made available by the devices of this invention.

Each producer gas reservoir can be fitted with a particle separator means and the ash particles can then be allowed to carry over into the producer gas reservoir. Ash removal from the producer gas reservoir is simpler than from the ash collection end of the primary reactor since whatever is collected in the producer gas reservoir can be removed as ashes without concern for removing unburned char fuel from the primary reactor. Similar particle separator means can also be used in the volatile matter in air mixture reservoir to separate such tar particles as are formed and these can then be removed by an ash removal type of mechanism. These are additional beneficial objects made available by the devices of this invention.

Where the principal product of a cyclic char fuel oxidation reactor plant is fuel gas the producer gas product can be kept separate from the volatile matter in air mixture product by use of two separate expanders. In this preferred way the differing product fuel gases can be used separately in differing applications to which each is best suited.

Where the principal product of a cyclic char fuel oxidation reactor plant is work output we may prefer to use a secondary reactor separate from the primary reactor. Complete combustion of both the volatile matter in air mixture and the producer gas is achieved within the secondary reactor and a supply of secondary air for burning the producer gas is stored for this purpose within a secondary air reservoir during compression.

BRIEF DESCRIPTION OF THE DRAWINGS

A schematic diagram of an example form of cyclic char fuel oxidation reactor plant is shown in FIG. 1 with the changeable gas flow connections from each compressor stage and each expander stage separately to the several primary reactor pressure vessel containers.

The changeable gas flow connections which a single primary reactor pressure vessel has between all compressor stages and all expander stages are shown in FIG. 5 for the same example cyclic char fuel oxidation reactor plant.

Figure 2:
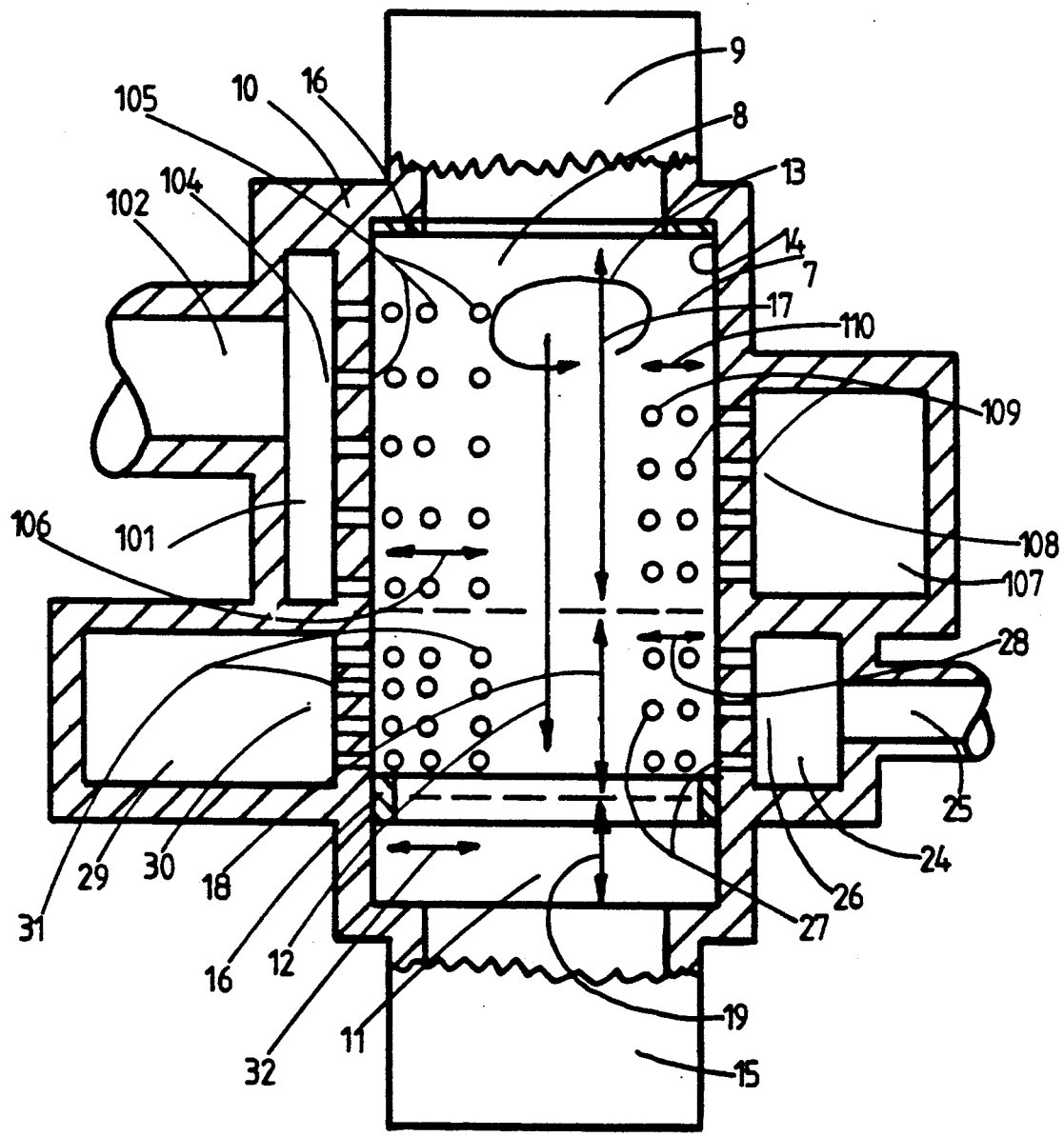

A cross sectional view of a primary reactor using opposed cross flow of gases is shown in FIG. 2.

Figure 3:
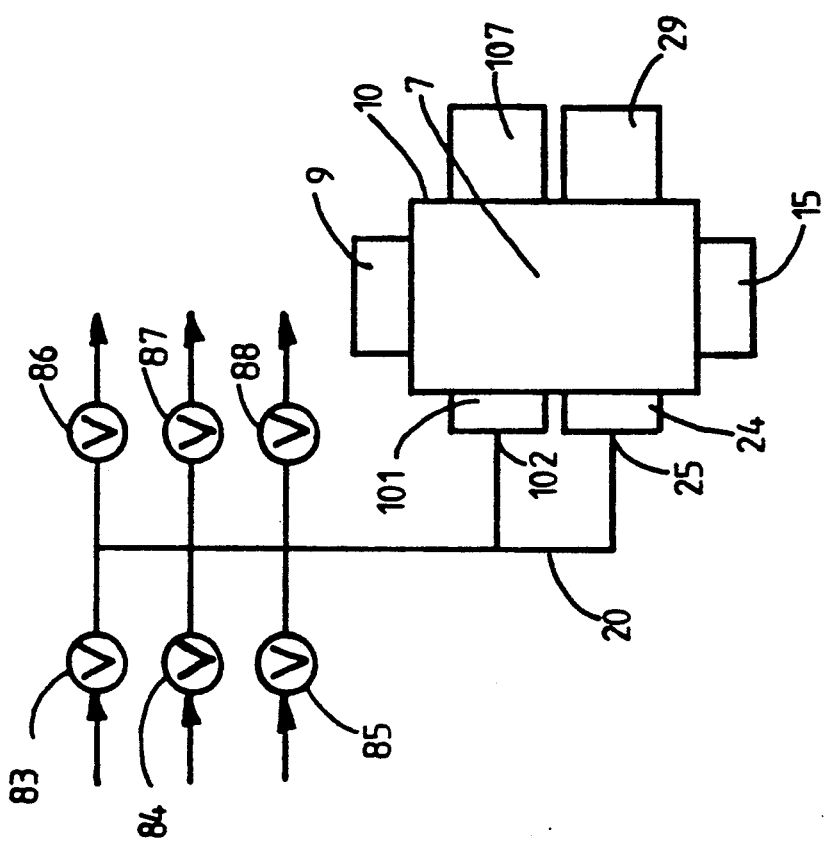

A schematic diagram of a reversed flow primary reactor is shown in FIG. 3 with its changeable gas flow connections to compressor stages and to expander stages.

Figure 4:
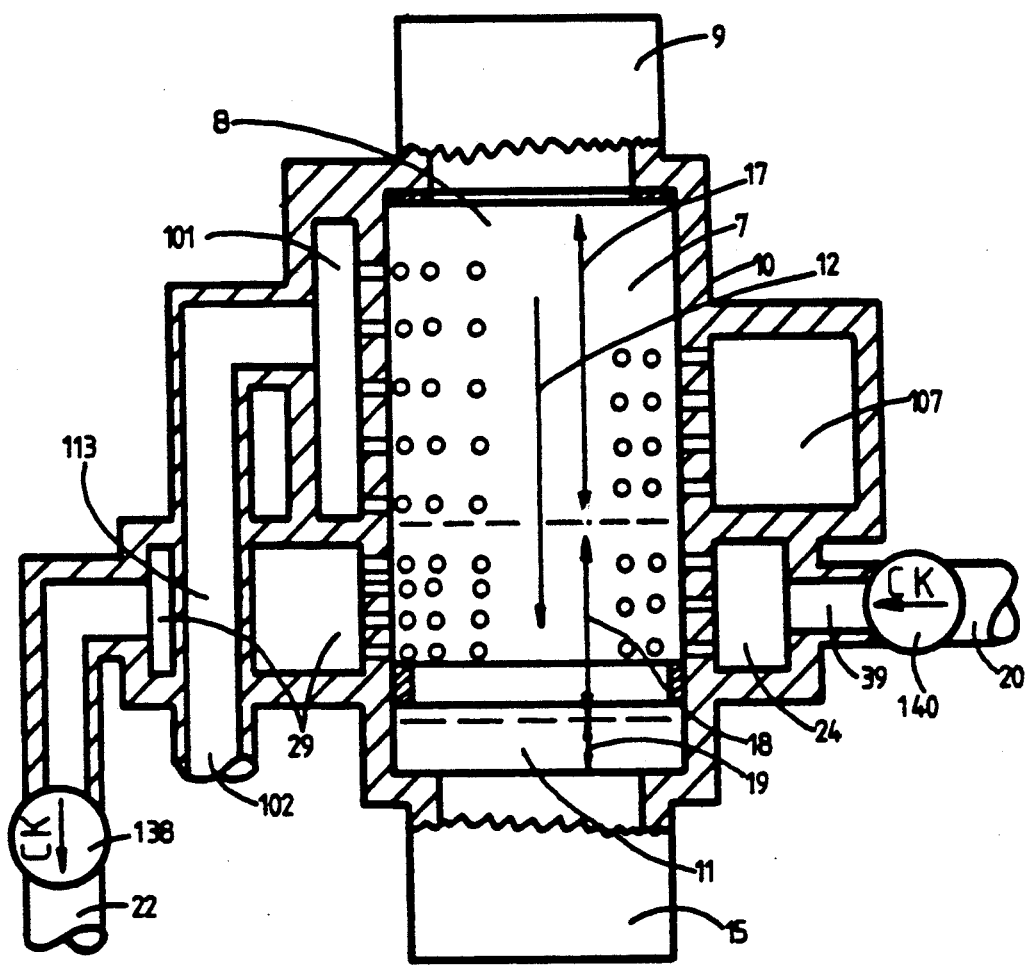

A cross sectional view of a primary reactor comprising a preheater for reactant air going to the volatile matter distillation zone is shown in FIG. 4.

Figure 6:
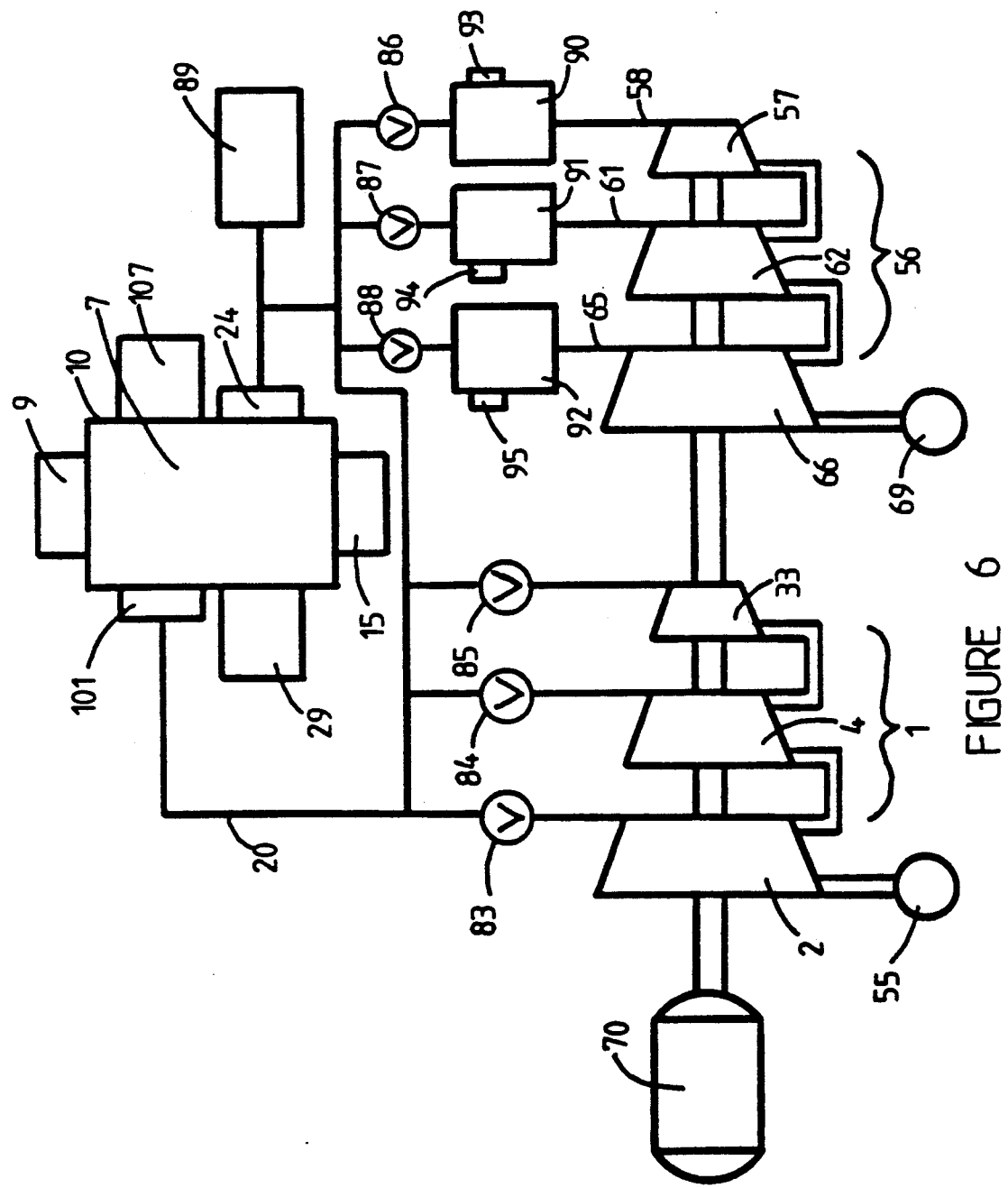

The cyclic char fuel oxidation reactor plant shown in FIG. 6 is an engine example whose principal product is a work output.

Figure 7:
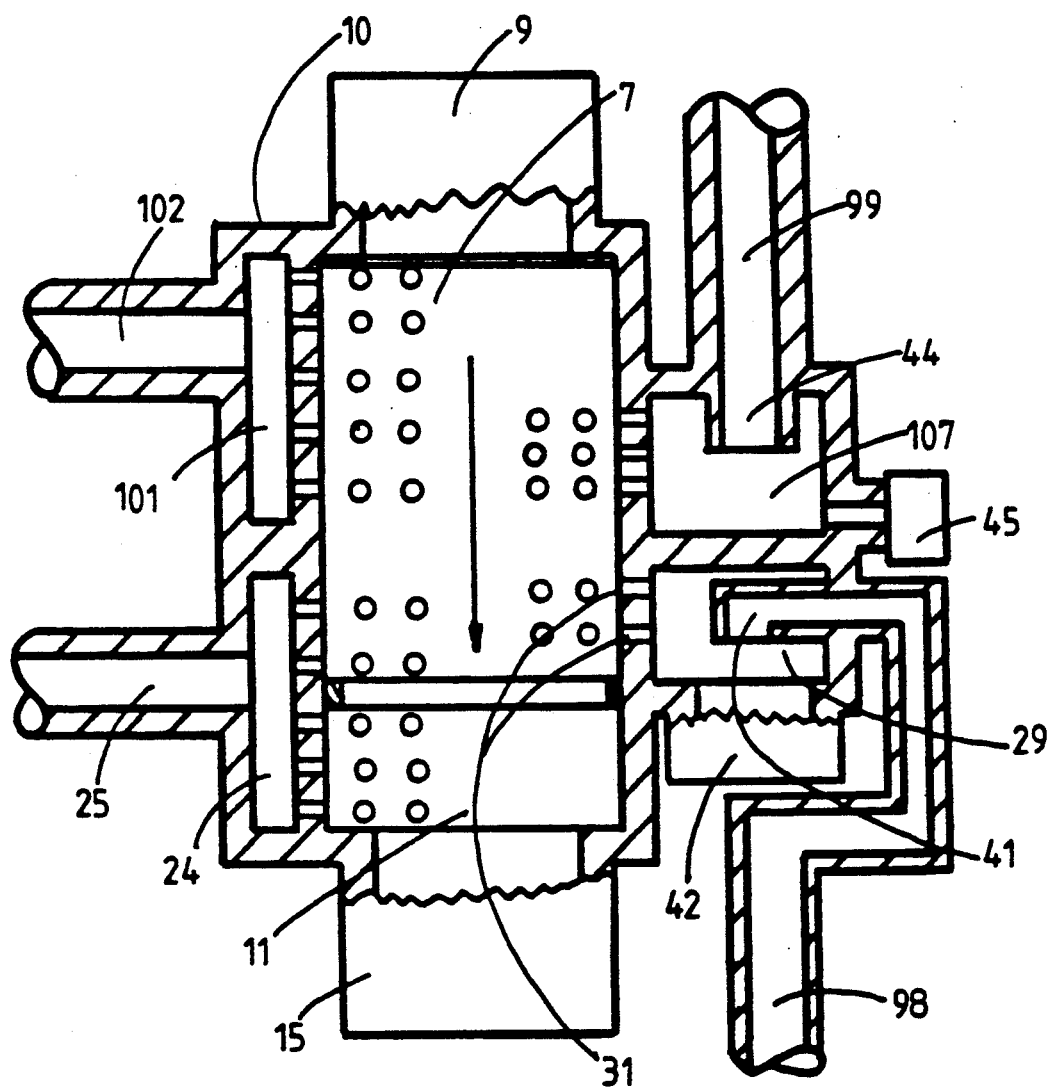

The primary reactor shown in cross section in FIG. 7 comprises ash and particle separator means within the product gas reservoirs.

Figure 8:
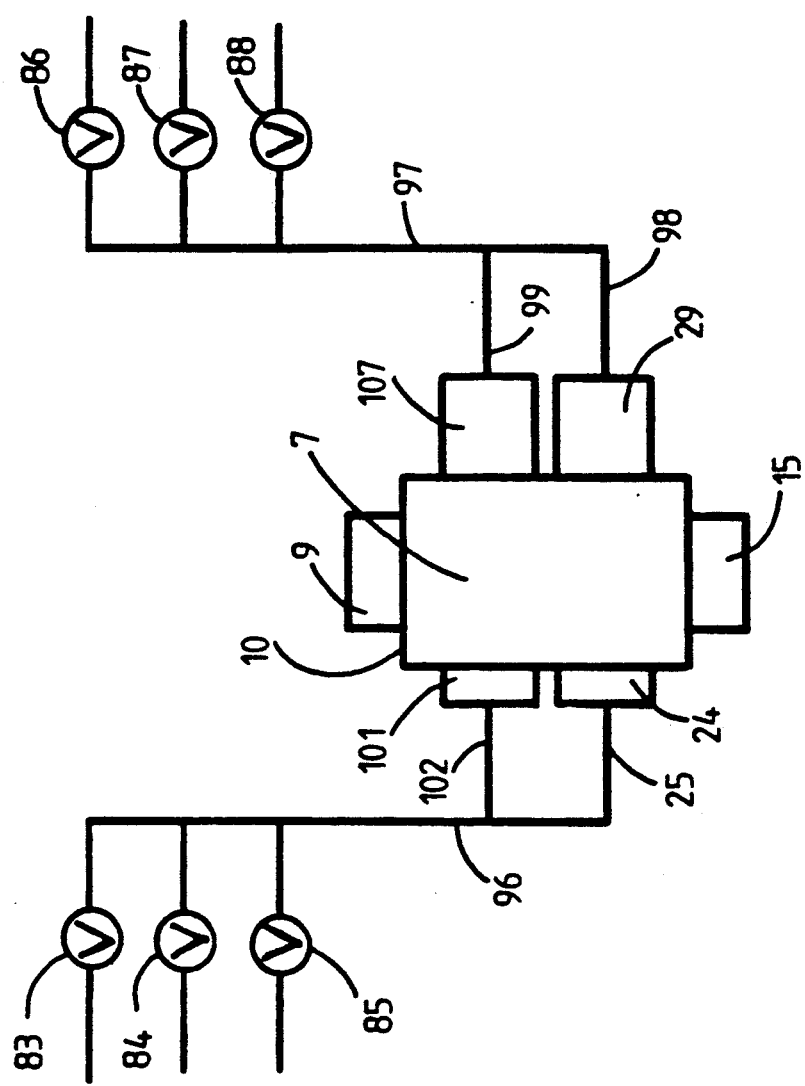

In FIG. 8 is shown a primary reactor with the several changeable gas flow connections to compressor stages and to expander stages arranged to produce unidirectional gas flow through the primary reactor.

Figure 9:
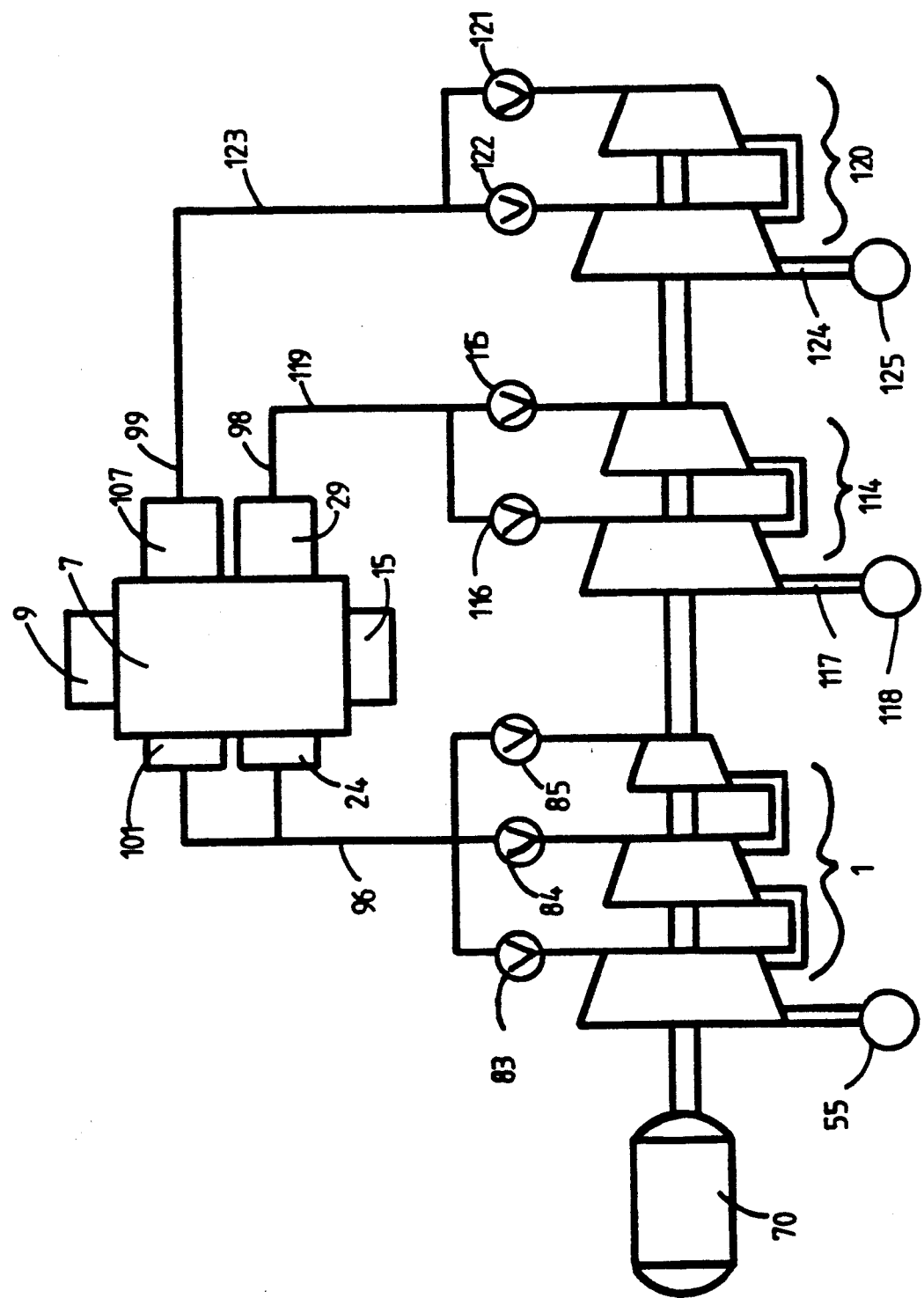

The cyclic char fuel oxidation reactor plant shown schematically in FIG. 9 is a gasifier example which produces two separated and differing product gas outputs.

Figure 10:
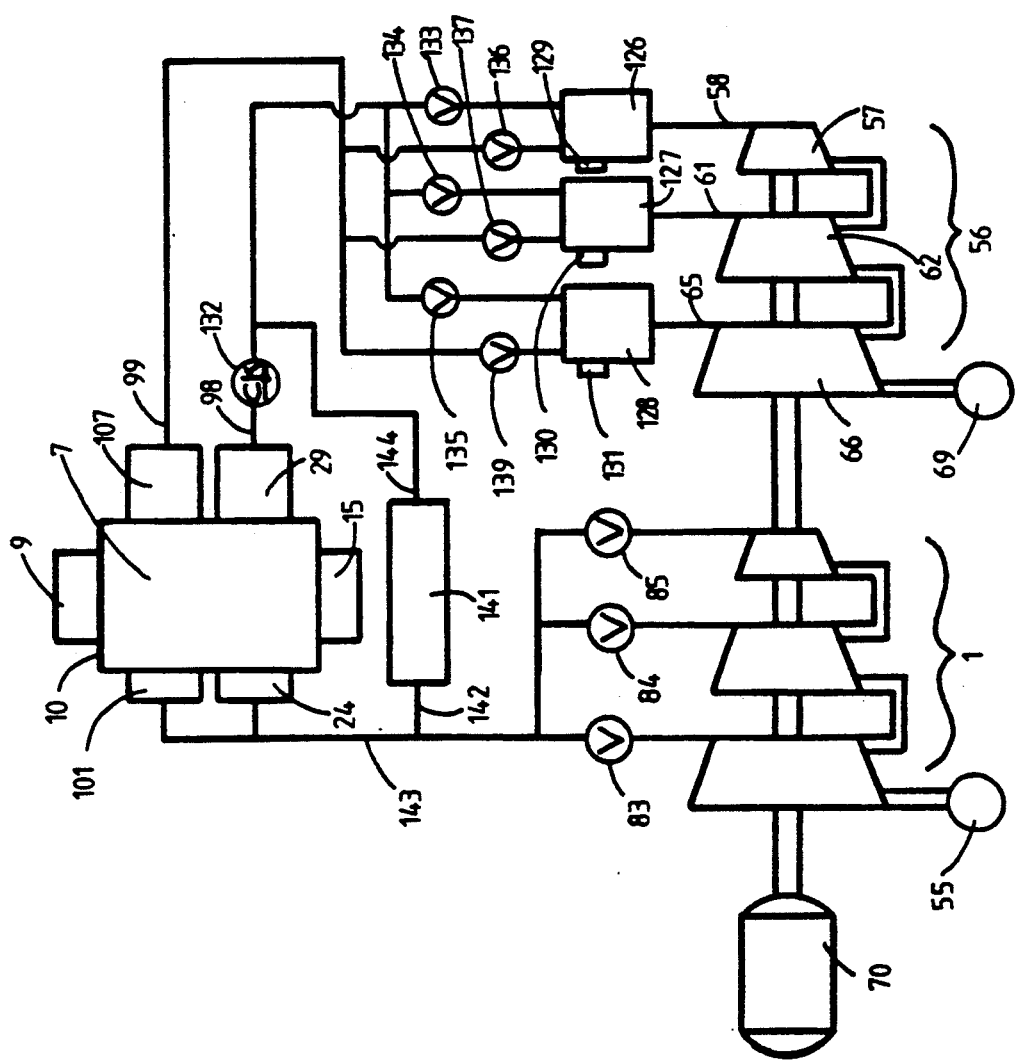

An engine example of cyclic char fuel oxidation reactor plant is shown schematically in FIG. 10 wherein the two differing product gases of the primary reactor are kept separated until burned in secondary reactors.

Figure 11:
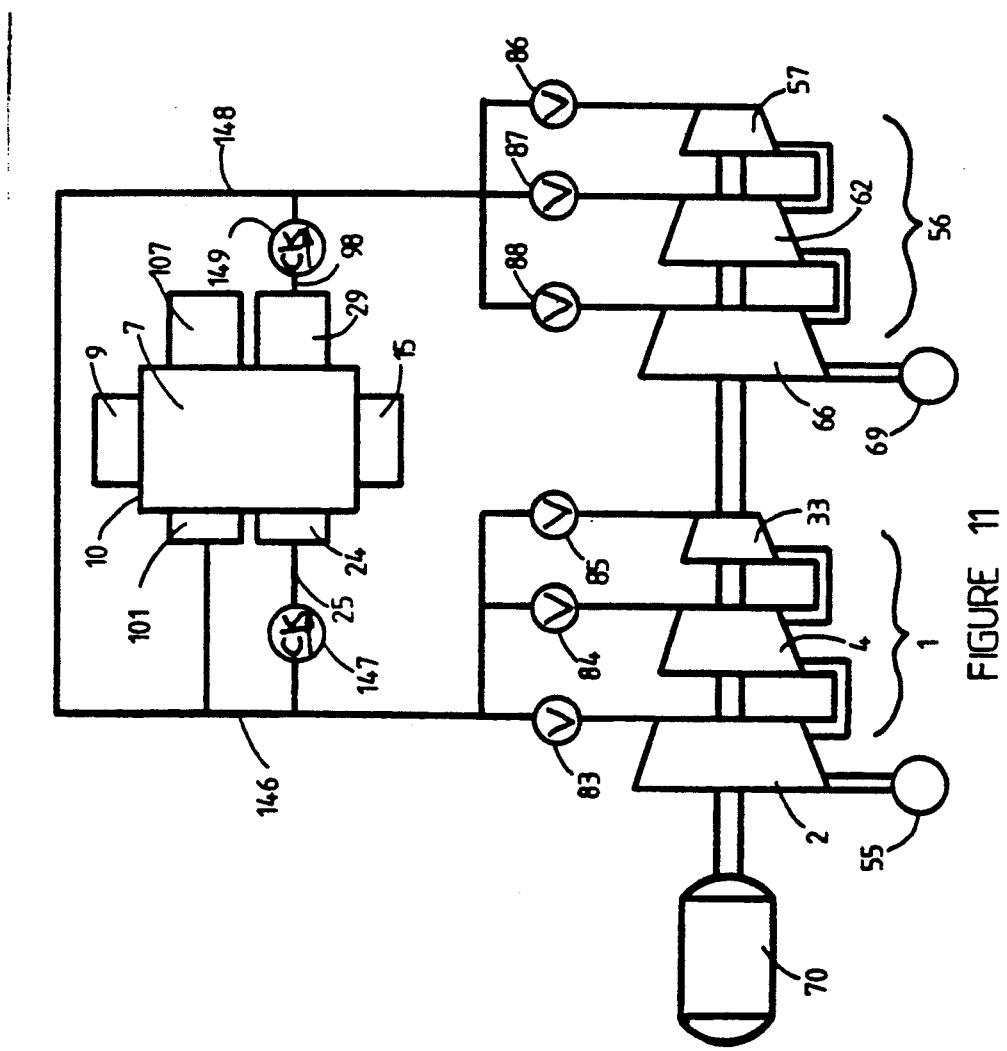

The primary reactors of the cyclic char fuel oxidation reactor plant shown schematically in FIG. 11 utilize unidirectional flow in one primary reactor zone and reversed flow in the other primary reactor zone.

DESCRIPTION OF THE PREFERRED EMBODIMENTS

Figure 1:
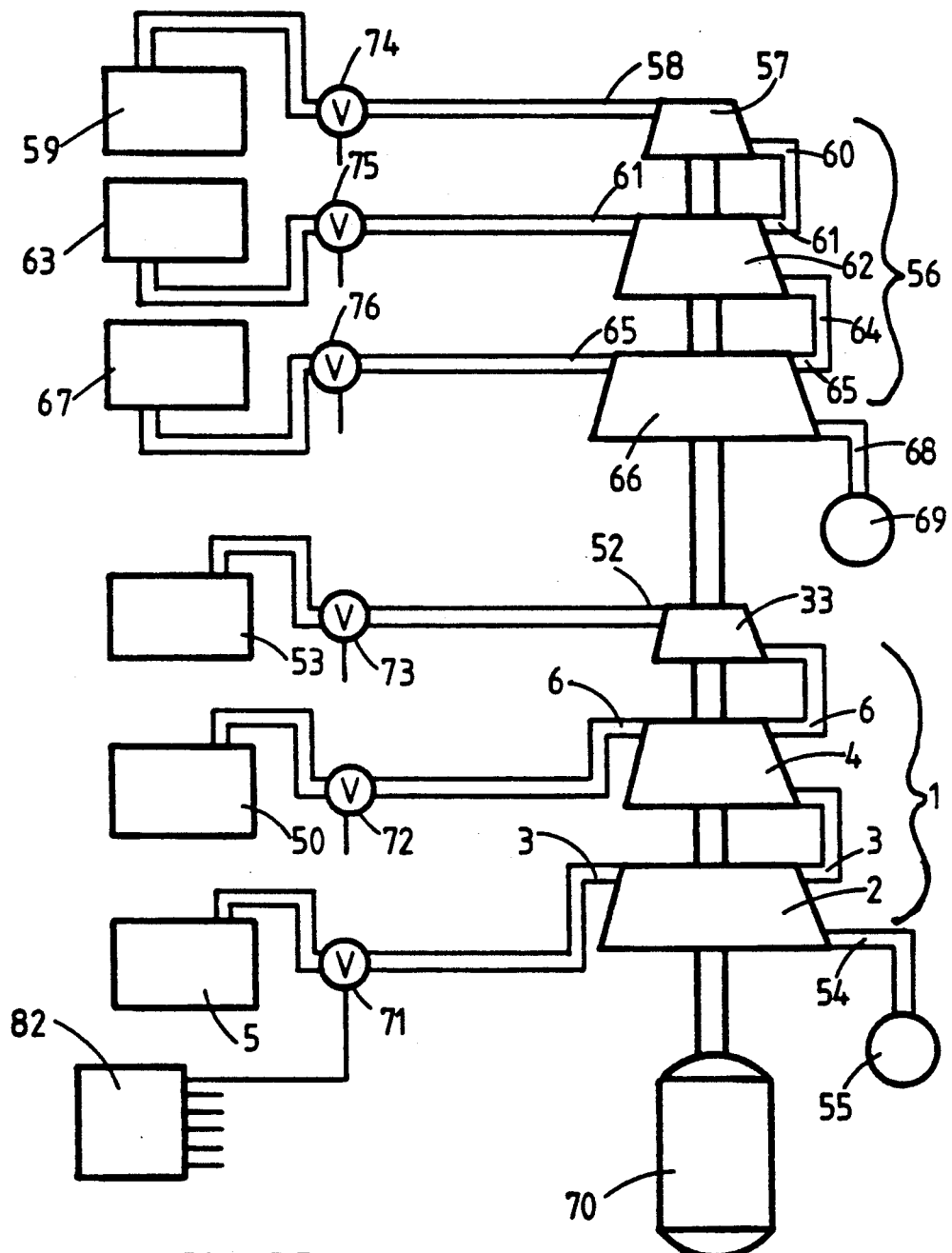
Figure 5:
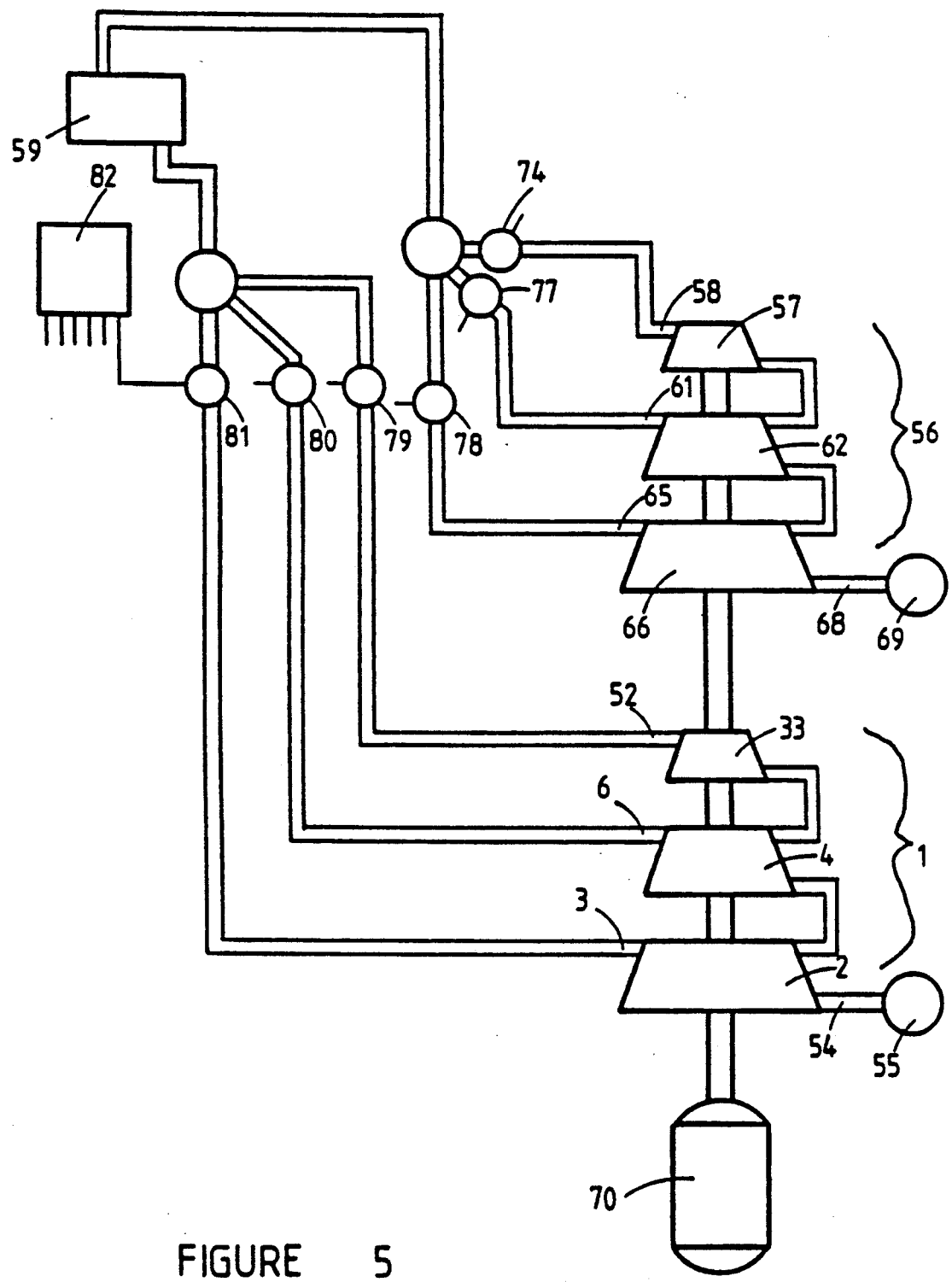

All forms of this invention are improvements to cyclic char fuel oxidation reactor plants, one example of such a plant is shown schematically in FIG. 1 and FIG. 5 and comprises:

1. A separate compressor means, 1, for compressing reactant gases into primary reactors, of three stages: a low pressure stage, 2, whose delivery end outlet, 3, connects to the input end of the intermediate pressure stage, 4, and also to primary reactor pressure vessel container, 5, containing a primary char fuel reaction chamber; an intermediate pressure stage, 4, whose delivery end outlet, 6, connects to the input end of the high pressure stage, 33, and also to the primary reactor pressure vessel container, 50, containing a primary char fuel reaction chamber; a high pressure stage, 33, whose delivery end outlet, 52, connects to the primary reactor pressure vessel container, 53, containing a char fuel primary reaction chamber. The inlet, 54, to the low pressure stage, 2, connects to a source, 55, of reactant gas containing appreciable oxygen gas, such as air.

2. A separate expander means, 56, for expanding reacted gases out of char fuel primary reaction chambers, of three stages: a high pressure stage, 57, whose inlet, 58, connects to primary reactor pressure vessel container, 59, containing a primary char fuel reaction chamber, and whose outlet, 60, connects to the inlet, 61, of the intermediate pressure stage, 62; an intermediate pressure stage, 62, whose inlet, 61, connects to a primary reactor pressure vessel container, 63, containing a char fuel primary reactor, and whose outlet, 64, connects to the inlet, 65, of the low pressure stage, 66; a low pressure stage, 66, whose inlet, 65, connects to a primary reactor pressure vessel container, 67, containing a char fuel primary reactor, and whose outlet, 68, connects to a receiver, 69, of reacted and expanded gases.

3. A drive means, 70, for driving the compressor, 1, such as an electric motor. Where the expander, 56, is a work generating engine the drive means, 70, can also be a means for absorbing the expander work output in excess of that needed to drive the compressor, 1, such as an electric generator, and in this case the expander engine, 56, drives the compressor, 1, in whole or part.

4. A number of separate pressure vessel containers, with primary reactors, 5, 50, 53, 59, 63, 67, at least equal to the sum of the number of compressor stages plus the number of expander stages.

5. The connections between stages of the compressor, 1, and between stages of the expander, 56, are fixed open gas flow connections which remain open whenever the plant is operating.

6. The connections, 71, 72, 73, between compressor stage outlets, 3, 6, 52, and primary reactor pressure vessel containers are changeable gas flow connections which can be opened or closed while the plant is operating and comprise means for opening and closing. The connections, 74, 75, 76, between expander stage inlets, 58, 61, 65, and primary reactor pressure vessel containers are also similar changeable gas flow connections. Only some of these changeable gas flow connections between compressor stages, expander stages, and primary reactor pressure vessel containers are shown in FIG. 1, which shows a set of such connections opened for one particular time period of a sequence of time periods.

7. Each separate primary reactor pressure vessel container has separate changeable gas flow connections to each compressor stage outlet and to each expander stage inlet and these are shown for the one particular pressure vessel container, 59, in FIG. 5 as follows:
   i. Changeable gas flow connections, 74, 77, 78, connect pressure vessel, 59, to expander stages, 57, 62, 66, respectively, when open;
   ii. Changeable gas flow connections, 79, 80, 81, connect pressure vessel, 59, to compressor stages, 33, 4, 2, respectively when open;

Each of the other primary reactor pressure vessel containers, 5, 50, 53, 63, 67, has similar separate changeable gas flow connections to compressor stage outlets and to expander stage inlets and not all of these are shown in FIG. 1 and FIG. 5 in order to avoid undue complexity of the drawings.

8. A control means, 82, operates on the means for opening and closing the several changeable gas flow connections so that the primary reactor pressure vessel container, 59, is open gas flow connected, in a sequence of time periods, first to each compressor stage outlet in time order of increasing stage outlet pressure in the order of stages, 2, 4, 33, then to each expander stage inlet in time order of decreasing stage inlet pressure in the order of stages, 57, 62, 66. The primary reactor pressure vessel container, 59, is thusly open gas flow connected to but one stage during any one time period of this sequence of time periods of open gas flow connections. This sequence of time periods of open gas flow connections is repeated for pressure vessel container, 59.

9. Each of the primary reactor pressure vessel containers, 5, 50, 53, 63, 67, is similarly open gas flow connected in a sequence of time periods, first to each compressor stage outlet in time order of increasing stage outlet pressure, next to each expander stage inlet in time order of decreasing stage inlet pressure, then this sequence of time periods is repeated, by action of the control means, 82. Each compressor stage outlet is open gas flow connected to but one primary reactor pressure vessel container during any one time period of the sequence of time periods, and each expander stage inlet is open gas flow connected to but one primary reactor pressure vessel container during any one such time period. Thus the several primary reactor pressure vessel containers, 5, 50, 53, 59, 63, 67, necessarily change connections at the same time and the time periods are the same for all primary reactor pressure vessel containers.

10. Each primary reactor pressure vessel container may contain only a primary reaction chamber or may additionally contain an integral secondary reaction chamber. For example, where the pressure vessel container is filled with char fuel only a primary reactor is contained. Alternatively, where the pressure vessel container is only partially filled with char fuel the space above the char fuel can be a secondary reactor where the secondary air, stored therein during compression, reacts with reacted gas emerging from the primary reactor within the char fuel during expansion. In this latter case the primary reactor pressure vessel container outlet is preferably connected into the secondary reaction chamber.

11. An example primary reactor pressure vessel container is shown in cross section in FIG. 2 wherein only a primary reactor is contained within the pressure vessel container. The primary reaction chamber, 7, contains char fuel which is added into the refuel end, 8, thereof by a refuel mechanism, 9, and this primary reactor is enclosed within the pressure vessel container, 10, and comprises: an ash collection end 11; a char fuel direction of motion, 12, from the refuel end, 8 toward the ash collection end, 11, in which direction the char fuel moves as it is being reacted and consumed within the primary reactor 7; a peripheral dimension, 13, around the outer surface, 14, of the primary reactor 7, at right angles to the char fuel motion direction, 12; an ash removal mechanism, 15, which in this FIG. 2 example removes ashes from the ash collection end, 11, of the primary reactor, 7; a starting heater means, 16, for preheating the char fuel in the primary reactor, 7, up to that temperature at which it reacts rapidly with oxygen in adjacent compressed reactant gas when the cyclic char fuel oxidation reactor is being started. Electrodes, 16, are used in FIG. 2 to pass a heating electric current directly through the char fuel itself in the example starting heater shown in FIG. 2, and a conductive char fuel is used during startup.

12. The fresh char fuel refueled into the refuel end, 8, of the primary reactor, 7, is cold, and will not react with compressed air, but is heated by conduction from those char fuel portions deeper into the primary reactor which are at a high temperature and are reacting rapidly with oxygen to create producer gas. Thus the first portion, 17, of the primary reaction chamber along the char fuel motion direction, 12, is a char fuel preheat zone, 17, and distillation of volatile matter takes place here also when char fuels containing volatile matter are being used. At the end of the preheat and volatile matter distillation zone, 17, the char fuel is at or above its rapid reaction temperature and enters the rapid reaction zone portion, 18, of the primary reaction chamber along the char fuel motion path, 12, where char fuel reacts rapidly with oxygen in adjacent compressed reactant gases to create a producer gas product, and the heat of this reaction maintains the rapid reaction zone at or above the char fuel rapid reaction temperature. Within the rapid reaction zone, 18, of the char fuel reactor, 7, the carbon of the char fuel is gasified to producer gas and leaves only the ashes which collect in the ash zone, 19, at the ash collection end, 11, of the char fuel motion path, 12.

The devices of this invention comprise additions to the separate primary reaction chamber, 7, of the cyclic char fuel oxidation reactor as described hereinabove, for the purpose of achieving more efficient utilization of those char fuels containing appreciable volatile matter, such as bituminous coal. One example of these additions to the primary reactor, 7, is shown in FIG. 2 and FIG. 3 and comprises:

13. A first reactant gas manifold, 24, is added whose inlet, 25, connects to the several changeable gas flow connections to compressor stage outlets 83, 84, 85, and expander stage inlets, 86, 87, 88, via connection, 20. The outlet, 26, of the first reactant gas manifold, 24, connects to several first ports, 27, into the primary reaction chamber, 7. These first reactant gas ports, 27, are positioned along that portion of the length of the char fuel motion path, 12, through the primary reactor, 7, which is adjacent to the rapid reaction zone, 18, and are positioned around a first inlet portion, 28, of the peripheral dimension, 13, of the primary reactor.

14. A producer gas reservoir, 29, is added whose inlet, 30, connects to several ports, 31, into the primary reaction chamber, 7. These producer gas ports, 31, are distributed along that portion, 18, of the char fuel motion path, 12, adjacent to the rapid reaction zone of the char fuel, and are positioned around a first outlet portion, 32, of the peripheral dimension, 13, of the primary reactor, 7.

15. The producer gas ports, 31, are preferably located on the side of the primary reactor opposite the first reactant gas ports, 27. Thus the first outlet portion of the primary reactor periphery is preferably opposite the first inlet portion thereof.

16. A second reactant gas manifold, 101, whose inlet, 102, connects to the several changeable gas flow connections to compressor stage outlets, 83, 84, 85 and expander stage inlets, 86, 87, 88, via connection, 20. The outlet, 104, of the second reactant gas manifold, 101, connects to several second ports, 105, into the primary reaction chamber, 7. These second reactant gas ports, 105, are positioned along that portion of the length of the char fuel motion path, 12, through the primary reactor, 7, which is adjacent to the char fuel preheat and volatile matter distillation zone, 17, and are positioned around a second inlet portion, 106, of the peripheral dimension of the primary reactor.

17. A volatile matter in air reservoir, 107, is added whose inlet, 108, connects to several ports, 109, into the primary reaction chamber, 7. These volatile matter in air mixture ports, 109, are distributed along that portion, 17, of the char fuel motion path, 12, adjacent to the char fuel preheat and volatile matter distillation zone, 17, and are positioned around a second outlet portion, 110, of the peripheral dimension, 13, of the primary reactor, 7. The volatile matter in air mixture ports, 109, are preferably located on the side of the primary reactor, 7, opposite the second reactant gas ports, 105. Thus the second outlet portion of the primary reactor periphery is preferably opposite the second inlet portion thereof.

18. The volatile matter in air mixture ports, 109, are preferably located on the side of the primary reactor, 7, opposite the second reactant gas ports, 105. Thus the second outlet portion of the primary reactor periphery is preferably opposite the second inlet portion thereof.

19. The producer gas ports, 31, the first reactant gas ports, 27, the volatile matter in air mixture ports, 109, and the second reactant gas ports, 105, preferably have at least one area cross section dimension which is smaller than the char fuel particles being refueled into the primary reactor, 7. These ports can be of various shapes such as round holes or slots.

20. The second inlet portion, 106, of the peripheral dimension, 13, is shown in FIG. 2 as being on the opposite side of the primary reactor from the first inlet portion, 28, of the peripheral dimension, 13, and this opposed arrangement may be preferred in some applications of cyclic char fuel oxidation reactors. With this opposed arrangement the gases cross flowing through the rapid reaction zone, 18, move in counterflow to the gases cross flowing through the volatile matter distillation zone, 17. But this opposed arrangement with gas counterflow is not necessary and other arrangements can also be used instead, as shown in FIG. 3.

A cyclic char fuel oxidation reactor plant, using a modified primary reactor pressure vessel container of this invention as shown in FIG. 2 and FIG. 3 operates as follows:

21. When the cyclic char fuel oxidation reactor of FIG. 1 and FIG. 5 is to be started, an electric current is passed through the char fuel in the rapid reaction zone to bring the char fuel up to its rapid reaction temperature. The compressor drive means, 70, then drives the compressor, 1, for starting and cycles of compression followed by expansion are commenced.

22. During compression compressed air flows from the connected compressor stage outlet, via the changeable gas flow connection into gas flow connection, 20, into the first reactant gas manifold, 24, and thence via the reactant gas ports, 27, into and across the primary reaction chamber, 7. Within the rapid reaction zone, 18, air reacts rapidly with hot char fuel to form producer gas which flows via the producer gas ports, 31, into the producer gas reservoir, 29. Producer gas is thus stored during compression within the producer gas reservoir, 29, as well as within the pore spaces of the rapid reaction zone, 18.

23. During expansion producer gas flows out of the producer gas reservoir, 29, reaction zone, 18, into the first reactant gas manifold, 24, via the first reactant gas ports, 27, and into the gas flow connecting means, 20, to the changeable gas flow connecting means to the connected expander stage inlet. For this FIG. 2 form of the invention the gas flow direction during expansion is thus the reverse of the flow direction during compression. The gas flows in principal part also across the direction of motion, 12, of the char fuel through the primary reactor, 7.

24. Also during compression compressed air flows from the connected compressor stage outlet via the changeable gas flow connection into gas flow connection, 20, into the second reactant gas manifold, 101, and thence via the second reactant gas ports, 105, into and across the primary reaction chamber, 7. Within the volatile matter distillation zone, 17, reactant air and evaporated volatile matter mix together to form a volatile matter in air mixture which flows via the volatile matter in air mixture ports, 109, into the volatile matter in air reservoir, 107. Volatile matter in air mixture is thus stored during compression within the volatile matter in air reservoir, 107, as well as within the pore space of the volatile matter distillation zone, 17.

25. During expansion volatile matter in air mixture flows out of the volatile matter in air reservoir, 107, volatile matter distillation zone, 17, into the second reactant gas manifold, 101, via the second reactant gas ports, 105, and into the gas flow connecting means, 20, to the changeable gas flow connecting means to the connected expander stage inlet. For this FIG. 2 form of the invention, the gas flow direction during expansion is thus the reverse of the flow direction during compression. The gas flows in principal part also across the direction of motion, 12, of the char fuel through the primary reactor, 7.

26. For this FIG. 2 form of the invention the reactant gas and producer gas cross flow direction through the rapid reaction zone is opposite to the cross flow direction of reactant gas and volatile matter in air mixture through the volatile matter distillation zone during both the compression time periods and the expansion time periods.

27. This cycle of compression followed by expansion is repeated. The starting heater means, 16, is turned off when the heat of the primary producer gas reaction within the primary reactor, 7, is sufficient to maintain the char fuel at its rapid reaction temperature within the rapid reaction zone, 18. The drive means for starting is turned off when the net work of the cycle is sufficient to keep the compressor running.

28. With the scheme of this invention shown in FIG. 2 air enters the rapid reaction zone, 18, from above, from the side, and from below via the ash collection zone, 19. A large and stable rapid reaction zone is thusly created by this ready air access thereto. Additionally those air portions passing through the ash collection zone, 19, are preheated therein, in part by conduction from the hot ash particles, and in part by final burnup of any carbon reaching the ash collection zone. This preheated air elevates the char fuel temperature in the rapid reaction zone. In these ways full char fuel burnup is obtained, a large and stable rapid reaction zone is created, some of whose air supply is preheated and these are among the beneficial objects made available by use of the schemes of this invention.

29. The primary reactor pressure vessel container, 10, shown in FIG. 2, uses the external connection, 20, as a combined inlet and outlet to and from the primary reactor, 7.

30. Most of the volatile matter in air mixture is kept out of the rapid reaction zone and in consequence is not burned therein to carbon dioxide and water vapor. By thus preventing or reducing the full combustion of the volatile matter in air mixture, appreciable formation of slow reacting carbon dioxide and water vapor within the rapid reaction zone is prevented, and the ash fusion and klinker formation consequent upon the high temperatures resulting from such full combustion are prevented or reduced. These are further beneficial objects made available by use of the FIG. 2 form of this invention.

Prior art, steady pressure, gas producers have also separated the volatile matter in air mixture from the rapid reaction zone as shown for example in the Westinghouse double zone gas producer. A description of this Westinghouse gas producer is presented in the book, Gas Engines and Producers, L. S. Marks and H. S. McDewell, American Technical Society, Chicago, 1919, on page 26 and 27 of the second, Gas Producers section therein.

31. The opposed cross flow form of this invention shown in FIG. 2 and described hereinabove may be preferred when char fuels being used contain a large amount of volatile matter. A large volatile matter quantity will require a large air quantity to create a stoichiometric or near stoichiometric volatile matter in air mixture. Hence a large heat quantity must be transferred from the hot char fuel and producer gas in the rapid reaction zone into the volatile matter distillation zone, not only to evaporate the large volatile matter quantity, but also to heat up the large air quantity going into the volatile matter in air mixture. With the opposed cross flow as shown in FIG. 2, this heat transfer occurs under the counterflow conditions described which makes available a larger quantity of heat transferable than can be transferred under parallel flow conditions. This is a beneficial object achievable by use of the opposed cross flow form of this invention.

32. When the primary reactor, 7, fully occupies the pressure vessel container, 10, as shown in the example of FIG. 2, no secondary reaction occurs therein and thus the reacted gases leaving the container, 10, via the combined inlet and outlet, 20, are producer gas admixed and enriched with a volatile matter in air mixture. If this is also the final product of the cyclic char fuel oxidation reactor plant, it will be a fuel gas of generally higher heating value per unit volume than producer gas not thusly enriched. This is another beneficial object made available by use of the devices of this invention.

For those cyclic char fuel oxidation reactor plants whose desired product is work output, a secondary reaction chamber, separate from the pressure vessel containing the primary reactor, may be preferred. The producer gas and volatile matter in air mixture can be supplied with needed additional secondary air and then burned to complete combustion products within the separate secondary reaction chamber. One particular example of such use of separate secondary reactors and additional secondary air sources is shown schematically in FIG. 6 for one primary reactor and comprises:

1. A pressure vessel container, 10, with primary reactor similar to that shown in FIG. 2 and described hereinabove.

2. A three stage compressor, 1, and a three stage expander, 56, as shown in FIG. 1 and described hereinabove.

3. The pressure vessel container, 10, has a combined inlet and outlet, 20, which connects to: changeable gas flow connections, 83, 84, 85, to compressor stage outlets; changeable gas flow connections, 86, 87, 88, to expander stage inlets; a secondary air reservoir, 89.

4. The secondary air reservoir, 89, stores air during compression and, during expansion, supplies secondary air into the producer gas, emerging from the primary reactor, so that complete burnup of this producer gas can be achieved in the secondary reactor. The secondary air reservoirs are within pressure vessel containers.

5. Each expander stage inlet, 58, 61, 65, is fitted with a secondary reaction chamber within a secondary reactor pressure vessel container, 90, 91, 92, and these equipped with igniter means, 93, 94, 95.

6. The changeable gas flow connections, 86, 87, 88, to expander stage inlets, 58, 61, 65, connect thereto via the secondary reactors, 90, 91, 92.

The example form of this invention shown in FIG. 6 operates as follows:

7. The primary reactor, 7, operates in the same manner during compression as described hereinabove.

8. Secondary air is stored in the secondary air reservoir, 89, during compression.

9. The primary reactor, 7, operates in the same manner during expansion as described hereinabove.

10. During expansion volatile matter in air mixture flows out of the volatile matter in air reservoir, 107, into the combined inlet and outlet, 20, via the second manifold, 101. Similarly producer gas flows out of the producer gas reservoir, 29, into the combined inlet and outlet, 20, and is there admixed with secondary air flowing out of the secondary air reservoir, 89. The thusly created producer gas in air mixture is mixed with the volatile matter in air mixture. This combined fuel gas in air mixture flows into the connected secondary reactor via the opened changeable gas flow connection and is ignited in the secondary reactor by the igniter means. Essentially complete burning of the combined fuel gas in air mixture can be thusly achieved within the secondary reactors. These completely burned secondary reacted gases then flow through the expander engine and produce the desired mechanical work output before being exhausted into the reacted gas receiver, 69.

In this way a char fuel can be burned to complete combustion products, comprising mostly of carbon dioxide and water vapor, while producing mechanical work output as the intended useful plant product. A detailed description of the use of reactant gas reservoirs, such as the secondary air reservoir, 89, is presented in my U.S. Pat. No. 4,865,623, Reactant Gas Reservoirs for Cyclic Solid with Gas Reactors, issued Sep. 12, 1989, and this material is incorporated herein by reference thereto.

For some applications of cyclic char fuel oxidation reactors a unidirectional flow of gases thorough the primary reactor may be preferred instead of the reversed flow of gases shown in FIG. 2, FIG. 3, and FIG. 6. An example gasifier form of cyclic char fuel oxidation reactor with unidirectional flow through the primary reactor is shown in FIG. 7 and the schematic diagram FIG. 8 and comprises:

1. The separate primary reactor pressure vessel container inlet, 96, connects between the changeable gas flow connections 83, 84, 85, from compressor stage outlets and the inlets, 25, 102, to the reactant gas manifolds, 24, 101, of the primary reactor, 7.

2. A separate outlet, 98, is added to the producer gas reservoir, 29, and another separate outlet, 99, is added to the volatile matter in air mixture reservoir, 107.

3. The separate primary reactor pressure vessel container outlet, 97, connects between the changeable gas flow connections, 86, 87, 88, to expander stage inlets and the added separate outlets, 98, 99, from the producer gas reservoir, 29, and the volatile matter in air mixture reservoir, 107, of the primary reactor, 7.

The form of this invention shown in FIG. 7 and FIG. 8 operates as follows:

4. During compression time periods air as reactant gas flows from the compressor into each reactant gas manifold, 24, and 101, and across the primary reaction chamber, 7, into the separate reservoirs, 29, and 107.

5. During expansion time periods producer gas flows out of the rapid reaction zone and the producer gas reservoir, 29, into the outlet, 98, and this gas flow direction through the rapid reaction zone during expansion is the same as the gas flow direction therein during compression.

6. Also during expansion time periods volatile matter in air mixture flows out of the volatile matter distillation zone and the volatile matter in air mixture reservoir, 107, into the outlet, 99, and this gas flow direction through the volatile matter distillation zone during expansion is the same as the gas flow direction therein during compression.

7. Only those changeable gas flow connections to the one primary reactor, 7, are shown in FIG. 8 but each primary reactor of the cyclic char fuel oxidation reactor will have similar separate changeable gas flow connections.

In this way the flow of gases through the primary reactor is unidirectional with gas flow directions during expansion being the same as during compression. With the cyclic char fuel oxidation reactor gasifier example shown in FIG. 7 and FIG. 8, the producer gas product and the volatile matter in air mixture product are mixed together before entering the expander.

In some gasifier applications of cyclic char fuel oxidation reactors we may prefer to keep the producer gas product separate from the volatile matter in air mixture product in order to utilize these different product fuel gases in different subsequent applications for which each product is most advantageously useable. One example scheme for keeping the producer gas product separate from the volatile matter in air mixture product utilizes two separate expanders, as shown schematically in FIG. 9 wherein the primary reactor, 7, can be the same as that shown in FIG. 7, and comprises:

1. A separate, two stage, producer gas expander engine, 114, with each stage inlet having changeable gas flow connections, 115, 116, only to each producer gas reservoir outlet, 98, via a separate first pressure vessel container outlet, 119, and with the lowest pressure stage outlet, 117, connecting into a producer gas product receiver, 118.

2. Another separate, two stage, volatile matter in air mixture expander engine, 120, with each stage inlet having changeable gas flow connections, 121, 122, only to each volatile matter in air mixture reservoir outlet, 99, via a separate second pressure vessel container outlet, 123, and with the lowest pressure stage outlet, 124, connecting into a volatile matter in air mixture product receiver, 125.

3. For the separate expander engines, 114, 120, only those changeable gas flow connections to the one primary reactor, 7, are shown in FIG. 9, but each primary reactor of the cyclic char fuel oxidation reactor will have similar separate changeable gas flow connections to these expander engine stage inlets.

4. The control means for controlling the opening and closing of the various changeable gas flow connections controls the opening and closing of the expander inlet changeable gas flow connections, 115, 116, 121, 122, for the primary reactor, 7, so that:

a. Whenever the first, high pressure stage of the producer gas expander, 114, is open gas flow connected to the producer gas reservoir, 29, the first high pressure stage, of the volatile matter in air mixture expander, 120, is open gas flow connected to the volatile matter in air mixture reservoir, 107.
 b. Similarly whenever the last, low pressure stage of the producer gas expander is open gas flow connected to the producer gas reservoir the last low pressure stage of the volatile matter in air mixture expander is open gas flow connected to the volatile matter in air mixture reservoir.
 c. Similarly for expanders of other than two stages, whenever a particular stage of the producer gas expander is open gas flow connected to a producer gas reservoir, the corresponding stage of the volatile matter in air mixture expander is open gas flow connected to the volatile matter in air mixture reservoir of the same primary reactor.

In this way the particular example form of this invention shown in FIG. 9, separates the producer gas product from the volatile matter in air mixture product and delivers them into separate product gas receivers, 118, 125, from which they can be delivered into differing subsequent uses for which each product gas is most advantageously suited.

Unidirectional flow of gases through the primary reactor with the producer gas product kept separate from the volatile matter in air mixture product can also be used advantageously for some engine applications of cyclic char fuel oxidation reactors. One particular example of such an engine application is shown schematically in FIG. 10 for one primary reactor, 7, such as that shown in FIG. 7 and comprises:

1. An expander engine, 56, of three stages, 57, 62, 66, wherein each stage inlet, 58, 61, 65, is fixed open gas flow connected to a separate secondary reactor and pressure vessel container, 126, 127, 128, and each secondary reactor comprises an igniter means, 129, 130, 131.

2. The producer gas reservoir, 29, of the primary reactor, 7, has a separate outlet, 98, which connects via the check valve, 132, to the changeable gas flow connections, 133, 134, 135, into the separate secondary reactor pressure vessel containers, 126, 127, 128.

3. The secondary air reservoir, 141, inlet, 142, connects to the combined inlet, 143, to the primary reactor pressure vessel container, 10, and the outlet, 144, of the secondary air reservoir, 141, connects to the producer gas changeable gas flow connections, 133, 134, 135, into the separate secondary reactor pressure vessel containers, 126, 127, 128.

4. The check valve, 132, functions to permit producer gas product flow out of the producer gas reservoir, 29, during expansion and to prevent backflow of reactant air into the producer gas reservoir during compression.

5. The volatile matter in air mixture reservoir has a separate outlet, 99, which connects to the changeable gas flow connections, 136, 137, 139, into the separate secondary reactor pressure vessel containers, 126, 127, 128. These volatile matter in air mixture connections into the secondary reactor are preferably adjacent to the igniter means, 129, 130, 131, so that the readily ignited volatile matter in air mixture can be ignited by the igniter means and the less easily ignited producer gas in air mixture can then be ignited in turn by the burning volatile matter in air mixture.

6. With these connections a producer gas in air mixture is supplied to the producer gas changeable gas flow connections, 133, 134, 135, and a volatile matter in air mixture is supplied to the volatile matter in air mixture changeable gas flow connections, 136, 137, 139, during expansion. These product gas in air mixtures are then burned to essentially complete combustion products within the secondary reactors, 126, 127, 128, before flowing into the expander engine to create a work output of the engine.

7. Only those changeable gas flow connections to the one primary reactor, 7, are shown in FIG. 10 but each primary reactor of the cyclic char fuel oxidation reactor will have similar separate changeable gas flow connections.

8. The changeable gas flow connections, 83, 84, 85, from compressor stage outlets to the combined reactant gas inlet, 143, to the primary reactor, 7, function in the same manner as described hereinabove.

Whole unidirectional gas flow in both the rapid reaction zone and the volatile matter distillation zone is shown, for example, in the forms of this invention shown in FIG. 8 and in FIG. 9. Wholly reversed flow in both the rapid reaction zone and the volatile matter distillation zone is shown, for example, in the form of this invention shown in FIG. 3. But other gas flow patterns can alternatively be used. For example, unidirectional flow through the rapid reaction zone with reversed flow through the volatile matter distillation zone is shown schematically in FIG. 11, for one of the primary reactors, 7, of a gasifier application of cyclic char fuel oxidation reactor, and comprises:

1. The three stage compressor, 1, with changeable gas flow connections, 83, 84, 85, and the three stage expander, 56, with changeable gas flow connections, 86, 87, 88, operate in the same manner as described hereinabove.

2. The combined reactant gas inlet, 146, to the primary reactor pressure vessel container, 10, is fixed open gas flow connected to the second reactant gas manifold, 101, to the volatile matter distillation zone, and is connected to the first reactant gas manifold, 24, inlet, 25, to the rapid reaction zone via the first check valve, 147.

3. The combined product gas outlet, 148, from the primary reactor pressure vessel container, 10, is fixed open gas flow connected to the combined reactant gas inlet, 146, and is connected to the outlet, 98, of the producer gas reservoir, 29, via the second check valve, 149.

4. The check valve, 147, permits gas flow only from the combined reactant gas inlet, 146, into the rapid reaction zone and producer gas reservoir, 29. The check valve, 149, permits gas flow only from the producer gas reservoir, 29, and rapid reaction zone into the combined product gas outlet, 148. In this way unidirectional flow is achieved through the rapid reaction zone of the primary reactor, 7.

5. The volatile matter in air mixture reservoir, 107, and volatile matter distillation zone connect to the combined product gas outlet, 148, only via the second reactant gas manifold, 101, and the combined reactant gas inlet, 146. Hence reversed flow is achieved through the volatile matter distillation zone of the primary reactor, 7.

A particular example of an application where single directional flow through the rapid reaction zone will be preferred is shown in FIG. 4, and comprises, in addition to various elements as already shown in FIG. 2, a producer gas fired preheater, 113, for the reactant gas flowing into the second reactant gas manifold, 101, and into and across the volatile matter distillation zone, 17. The second reactant gas inlet connection, 102, passes through a preheater, 113, in the producer gas reservoir, 29, and in this way the reactant gas passing into second reactant gas manifold, 101, is preheated by the hot producer gas in the reservoir, 29, The reactant gas connection, 102, the preheater, 113, and the producer gas reservoir, 29, are sealed from each other to prevent intermixing of the gases. Such preheating of reactant gas may be preferred when the char fuel being used is high in volatile matter and hence requires appreciable heating, both to evaporate the volatile matter, and to preheat the reactant gas air being admixed therewith. Such preheating of reactant gas also cools the producer gas in the reservoir, 29, and we will prefer that this cool producer gas not reverse flow during expansion back through the rapid reaction zone, 18, where it could chill the hot char fuel therein. Hence in this FIG. 4 example form of the invention check valve, 140, and check valve, 138, are used to secure single directional flow of gas through the rapid reaction zone, 18, during both compression and expansion time intervals whereas reversed flow occurs through the volatile matter distillation zone.

For prior art cyclic char fuel oxidation reactors ash removal mechanism, 15, means for removing ashes were used to remove ashes from the ash collection end, 11, of the primary reactor, 7, and this method can also be used for the present invention. Alternatively, or additionally, ashes can be carried over from the ash collection end, 11, into the producer gas reservoir, 29, and there separated from the gas and then removed from the producer gas reservoir. For this purpose the producer gas ports, 31, are made larger in cross section than the ash particles, a separator means, 41, for separating particles from the producer gas is placed in the producer gas reservoir, 29, and an ash removal mechanism, 42, is installed on the producer gas reservoir, 29, as shown schematically in FIG. 7. Various types of gas solid separators can be used as the separator means, 41, such as cyclone separators or other centrifugal force separators. It is simpler to remove ashes from the producer gas reservoir since whatever particles are collected there can be removed without fear of removing any reactable char fuel from the primary reaction chamber. The ash removal mechanism, 15, which removes ashes from the ash collection end, 11, of the primary reactor, 7, needs to be controlled so that only ashes and not char fuel are removed. In similar fashion a separator means, 44, for separating solid or liquid particles from the gaseous volatile matter in air mixture, can be installed in the volatile matter in air mixture reservoir, 107, together with an ash removal mechanism, 45, means for removing solid and liquid particles. Liquid tars are the principal material separated from the volatile matter in air mixture and a liquid drain valve or drain trap is one form of ash removal mechanism, 45, suitable for use here.

A richer producer gas of higher volumetric heating value can be created by admitting steam into the rapid reaction zone where the producer gas is formed. This reaction of steam with hot carbon to form additional carbon monoxide and hydrogen fuels is endothermic and can thus also be used to prevent excessively high temperatures in the rapid reaction zone. We wish to thusly limit rapid reaction zone temperature in order to minimize ceramic liner durability problems and also ash fusion and klinker problems. Producer gas volumetric heating value can also be increased by oxygen enrichment of the reactant gas entering the rapid reaction zone. But we only want such steam and/or enriching oxygen to pass into the rapid reaction zone where producer gas is being formed. Use of the separate first and second reactant gas manifolds of this invention permits such efficient utilization of steam and oxygen since these gases can be put only into the first reactant gas manifold from which reactant gases flow into the rapid reaction zone.

Various types of igniter means, 93, 94, 95, can be used, such as electric sparks, glow plugs, burning gas air jets, etc., as is well known in the art of ignition of combustible fuel in air mixtures.

Char fuels vary greatly in the proportion of volatile matter they contain; fuels such as coke or anthracite containing little or no volatile matter, whereas fuels such as bituminous coal, wood, biomass, etc. may contain well in excess of fifty percent volatile matter by weight. Hence the ratio of the volume within which the volatile matter in air mixture is stored to the volume within which the producer gas is stored during compression is preferably different for differnt char fuels differing in volatile matter content. The optimum value of this volumes ratio is best determined experimentally for each char fuel in a running cycle char burning oxidation reactor. Various criteria of optimization can be chosen. For example, in gasifier applications the product fuel gas energy content per unit volume could be maximized. For work output applications work output or efficiency could be maximized. An approximation of the best value for this volumes ratio can be estimated from the proximate and ultimate analyses of the char fuel, corrected to an ash and moisture free basis (maf basis) and using the following relations:

$$(GVR) = (GR)\left(\frac{MWP}{MWVMA}\right)\left(\frac{TVMA}{TPR}\right)$$

Wherein:

$$(GVR) = \frac{(\text{Vol. of Volatile Matter Air Mixture})}{(\text{Vol. of Producer Gas})} = \frac{(VVMA)}{(VPR)}$$

(VVMA)=Volume of volatile matter in air mixture within its reservoir and within the preheat and distillation zone of the primary reactor at end of compression;

(VPR)=Volume of producer gas within its reservoir and within the rapid reaction zone of the primary reactor at end of compression;

$$(GR) = \frac{(\text{Mass of Volatile Matter Air Mixture})}{(\text{Mass of Producer Gas})}$$

$$(GR) = \frac{12(n - F) + m + 16r + 4.76(29)\left(n - F + \frac{m}{4} - \frac{r}{2}\right)}{28F + 64s + (28)\left[3.76\left(\frac{F}{2} + s\right) + \frac{t}{2}\right]}$$

$$n = \frac{(C)(MWC)}{(12)(100)}$$

$$m = \frac{(H)(MWC)}{(100)}$$

$$r = \frac{(O)(MWC)}{(16)(100)}$$

$$s = \frac{(S)(MWC)}{(32)(100)}$$

$$t = \frac{(N)(MWC)}{(14)(100)}$$

(MWC)=Assumed char fuel molecular weight. Values of 1000 to 10000 can be used here with no effect on volumes ratio.

C=Wt. percent carbon by ultimate analysis of char fuel;

H=Wt. percent hydrogen by ultimate analysis of char fuel;

O=Wt. percent oxygen by ultimate analysis of char fuel;

S=Wt. percent sulfur by ultimate analysis of char fuel;

N=Wt. percent nitrogen by ultimate analysis of char fuel;

These molecular weights and weight percents are for a moisture and ash free char fuel (maf).

$$(F) = \frac{(FC)(MWC) - 32(s) - 14(t)}{12}$$

(FC)=Wt. fraction fixed carbon by proximate analysis (maf) of char fuel;

(MWP)=Average molecular weight of producer gas;

$$(MWP) = \frac{28F + 64s + 14t + 3.76\left(\frac{F}{2} + s\right)(28)}{F + s + \frac{t}{2} + 3.76\left(\frac{F}{2} + s\right)}$$

(MWVMA)=Average molecular weight of volatile matter in air mixture assuming a stoichiometric ratio;

$$(MWVMA) = \frac{138\left(n - F + \frac{m}{4} - \frac{r}{2}\right) + (12n - 12F + m + 16r)}{4.76\left(n - F + \frac{m}{4} - \frac{r}{2}\right) + \frac{12n - 12F + m + 16r}{(MWVM)}}$$

(MWVM)=Average molecular weight of the volatile matter. Values between 100 and 5000 can be used here with very little effect on the estimated volumes ratio.

(TVMA)=Average absolute temperature of the volatile matter in air mixture at maximum compression pressure;

(TPR)=Average absolute temperature of the producer gas at maximum compression pressure;

Accurate estimations of each of these two average temperatures is difficult at best. However the ratio of these two temperatures can be roughly approximated as about two thirds. Those factors, such as external heat transfer or compression ratio, affecting each of these temperatures roughly proportionately.

$$\frac{(TVMA)}{(TPR)} = 0.66 \text{ approximately}$$

Where a cyclic char oxidation reactor is to be used with various char fuels, differing in volatile matter content, the volume of one or both of the producer gas reservoir and the volatile matter in air mixture reservoir can be made adjustable, as by use of add on volumes, or by adjustable piston in cylinder volumes. Such adjustable reservoir volumes could also be used as a means for controlling work output since the extent of char fuel reaction per cycle varies directly with the gas volume reacted.

In many applications of cyclic char fuel oxidation reactors the expander is preferably an engine as described hereinabove so that mechanical work output can be recovered from the expansion of the product gases. In other applications a simple throttling or blowdown expander may be preferred as a lower cost plant which requires a work input to drive the compressor.

Having thus described my invention what I claim is:

1. In a cyclic char fuel oxidation reactor plant comprising:

a separate compressor means for compressing reactant gases comprising at least one stage and each said stage comprising an outlet pipe for reactant gases being compressed therein;

drive means for driving said compressor;

at least one separate expander means for expanding reacted gases and each expander comprising at least one stage and each said stage comprising an inlet pipe for reacted gases to be expanded therein;

a source of reactant gas containing appreciable oxygen gas;

said compressor comprising an inlet to the lowest pressure stage thereof;

a fixed open gas flow connection from said compressor inlet to said source of reactant gas;

said expander comprising an outlet from the lowest pressure stage thereof;

at least one receiver of expanded reacted gas;

a fixed open gas flow connection from said expander outlet to said receiver of reacted gas;

means for absorbing any work output of said expander;

a number of primary reactor pressure vessel containers at least equal to the sum of the number of compressor stages plus the number of expander stages and each said primary reactor pressure vessel container comprising:

at least a primary char fuel reaction chamber within said primary reactor pressure vessel container;

an inlet to said primary reactor pressure vessel container;

at least one first outlet from said primary reactor pressure vessel container;

said primary char fuel reaction chamber comprising:

a refuel end and an ash collection end;

a refuel mechanism means for placing char fuel into said primary reactor via the refuel end thereof;

a direction of char fuel motion within said primary reactor from said refuel end toward said ash collection end;

a peripheral dimension around the outer surface of said primary reactor at right angles to said char fuel motion direction;

a volatile matter distillation and fuel preheat zone positioned toward said refuel end of said primary reactor;

an ash collection zone positioned toward said ash collection end of said primary reactor;

a rapid reaction zone positioned between said volatile matter distillation and fuel preheat zone and said ash collection zone;

at least one means for removing ashes from said primary reactor;

means for preheating said char fuel within said primary reactor to that temperature at which said char fuel reacts rapidly with oxygen in adjacent compressed reactant gases when said cyclic char fuel oxidation reactor plant is being started;

means for driving said compressor means when said cyclic char fuel oxidation reactor plant is being started;

several separate changeable gas flow connections, comprising means for opening and closing, from each compressor stage outlet pipe to each primary reactor pressure vessel container inlet and from each expander stage inlet of at least one expander to each primary reactor pressure vessel container first outlet;

control means for controlling said means for opening and closing said several separate changeable gas flow connections so that: each said primary reactor pressure vessel container is open gas flow connected, in a sequence of time periods, first to each compressor stage outlet in time order of increasing stage outlet pressure, then to each expander stage inlet in time order of decreasing stage inlet pressure; each compressor stage outlet is open gas flow connected to but one primary reactor pressure vessel container during any one time period of said sequence of time periods, and each expander stage inlet is open gas flow connected to but one primary reactor pressure vessel container during any one time period of said sequence of time periods, and each primary reactor pressure vessel container is open gas flow connected to but one stage during any one time period of said sequence of time periods; said sequence of time periods of open gas flow connections to compressor stage outlets and to expander stage inlets is repeated for each said primary reactor pressure vessel container;

an improvement comprising:

dividing said peripheral dimension of said primary reactor into separate inlet portions, separate outlet portions, and separate sealed portions;

adding to each said primary reactor:

two separate reactant gas manifolds and each said reactant gas manifold comprising an inlet and an outlet; a first reactant gas manifold whose outlet connects to first reactant gas inlet ports into said primary reaction chamber, and these first inlet ports being positioned along that portion of the length of said primary reaction chamber, in said direction of char fuel motion, which is adjacent to said rapid reaction zone, and these first inlet ports being positioned around a first said inlet portion of the periphery of said primary reaction chamber; a second reactant gas manifold whose outlet connects to second reactant gas inlet ports into said primary reaction chamber, and these second inlet ports being positioned along that portion of the length of said primary reaction chamber, in said direction of char fuel motion, which is adjacent to said volatile matter distillation zone, and these second inlet ports being positioned around a second said inlet portion of the periphery of said primary reaction chamber;

a producer gas reservoir comprising an inlet, said inlet connecting to producer gas outlet ports out of said primary reaction chamber, and these ports positioned along that portion of said length of said primary reaction chamber along said direction of char fuel motion which is adjacent to said rapid reaction zone, and these ports positioned around a first outlet portion of the periphery of said primary reaction chamber, said first outlet portion of said periphery being on the opposite side of said primary reaction chamber from said first inlet portion of said periphery;

a volatile matter in air mixture reservoir comprising an inlet, said inlet connecting to volatile matter in air mixture outlet ports out of said primary reaction chamber, and these ports positioned along that portion of said length of said primary reaction chamber along said direction of char fuel motion which is adjacent to said volatile matter distillation zone, and these ports positioned around a second outlet portion of the periphery of said primary reaction chamber, said second outlet portion of the periphery being on the opposite side of said primary reaction chamber from said second inlet portion of said periphery;

wherein all of said reactant gas inlet ports and also all of said outlet ports are smaller in at least one area cross section dimension than the char fuel particles being refueled into said primary reaction chamber;

fixed open gas flow connections from said primary reactor pressure vessel container inlet to said first reactant gas manifold inlet, and to said inlet of said second reactant gas manifold;

wherein said primary reactor pressure vessel container inlet and outlet are combined.

2. In a cyclic char fuel oxidation reactor plant as described in claim 1:
wherein said first inlet portion of the periphery of said primary reaction chamber is on the opposite side of said primary reaction chamber from said second inlet portion of the periphery of said primary reaction chamber.

3. In a cyclic char fuel oxidation reactor plant as described in claim 1:
wherein said primary reactor pressure vessel container inlet and outlets are separate;
wherein said producer gas reservoir further comprises an outlet separate from said inlet;
wherein said volatile matter in air mixture reservoir comprises an outlet separate from said inlet;
and further comprising:
fixed open gas flow connections from said primary reactor pressure vessel container first outlet to said outlet of said producer gas reservoir and to said outlet of said volatile matter in air mixture reservoir.

4. In a cyclic char fuel oxidation reactor plant as described in claim 3:
wherein said first inlet portion of the periphery of said primary reaction chamber is on the opposite side of said primary reaction chamber from said second inlet portion of the periphery of said primary reaction chamber.

5. In a cyclic char fuel oxidation reactor plant as described in claim 1 and further comprising:
a number of added secondary reactor pressure vessel containers, equal to the number of expander stages, and each said secondary reactor pressure vessel comprising: at least one first inlet, an outlet with a fixed open gas flow connection only to one expander stage inlet, a secondary reactor comprising an igniter means for igniting fuel gas in air mixtures, and each expander stage inlet having a fixed open gas flow connection only to the outlet of but one secondary reactor pressure vessel container, said first inlet to said secondary reactor pressure vessel container connecting to said several separate changeable gas flow connections from each said primary reactor pressure vessel container first outlet to said expander stage;
each primary reactor further comprising:
a third reactant gas reservoir pressure vessel container comprising an inlet and outlet and wherein said inlet and outlet are combined;
a fixed open gas flow connection from said inlet of said third reactant gas reservoir pressure vessel container to said inlet of said primary reactor pressure vessel container.

6. In a cyclic char fuel oxidation reactor plant as described in claim 5:
wherein said first inlet portion of the periphery of said primary reaction chamber is on the opposite side of said primary reaction chamber from said second inlet portion of the periphery of said primary reaction chamber.

7. In a cyclic char fuel oxidation reactor plant as described in claim 3 and further comprising:
a number of added secondary reactor pressure vessel containers, equal to the number of expander stages, and each said secondary reactor pressure vessel comprising: at least one first inlet, an outlet with a fixed open gas flow connection only to one expander stage inlet, a secondary reactor comprising an igniter means for igniting fuel gas in air mixtures, and each expander stage inlet having a fixed open gas flow connection only to the outlet of but one secondary reactor pressure vessel container, said first inlet to said secondary reactor pressure vessel container connecting to said several separate changeable gas flow connections from each said primary reactor pressure vessel container first outlet to said expander stage; each primary reactor further comprising:
a third reactant gas reservoir pressure vessel container comprising an inlet and a separate outlet;
a fixed open gas flow connection from said inlet of said third reactant gas reservoir pressure vessel container to said inlet of said primary reactor pressure vessel container;
a fixed open gas flow connection from said outlet of said third reactant gas reservoir pressure vessel container to said first outlet of said primary reactor pressure vessel container.

8. In a cyclic char fuel oxidation reactor plant as described in claim 7:
wherein said first inlet portion of the periphery of said primary reaction chamber is on the opposite side of said primary reaction chamber from said second inlet portion of the periphery of said primary reaction chamber.

9. In a cyclic char fuel oxidation reactor plant as described in claim 1:
wherein said primary reactor pressure vessel container inlet and outlet are separate;
wherein said producer gas reservoir comprises an outlet separate from said inlet;
wherein said volatile matter in air mixture reservoir comprises an outlet separate from said inlet;
a fixed open gas flow connection from said primary reactor pressure vessel container first outlet only to said producer gas reservoir outlet;
wherein each said primary reactor pressure vessel container comprises a second separate outlet;
wherein said second separate outlet of said primary reactor pressure vessel container has a fixed open gas flow connection only to said separate outlet of said volatile matter in air mixture reservoir;
wherein said cyclic char fuel oxidation reactor plant comprises two separate expander means each having the same number of stages, a producer gas separate expander means, and a volatile matter in air mixture separate expander means;
wherein said changeable gas flow connections from said primary reactor pressure vessel container first outlets connect only to said inlets of each stage of said producer gas expander means;

wherein said producer gas separate expander means comprises a separate outlet from the lowest pressure stage thereof;

wherein said volatile matter in air mixture separate expander means comprises a separate outlet from the lowest pressure stage thereof;

and further comprising:

a receiver of expanded producer gas;

a receiver of expanded volatile matter in air mixture;

a fixed open gas flow connection from said producer gas receiver to said separate outlet of said producer gas expander means;

a fixed open gas flow connection from said volatile matter in air mixture receiver to said separate outlet of said volatile matter in air mixture expander means;

first additional separate changeable gas flow connections, comprising means for opening and closing, from each said second separate outlet of each said primary reactor pressure vessel container to each said inlet of each stage of said volatile matter in air mixture separate expander means;

first additional control means for controlling said means for opening and closing said first additional separate changeable gas flow connections so that: when a primary reactor first outlet is open gas flow connected for a time period to one particular stage of said producer gas expander means, the second outlet of that same primary reactor is open gas flow connected for that same time period to the corresponding particular stage of said volatile matter in air mixture expander means.

10. In a cyclic char fuel oxidation reactor plant as described in claim 9:

wherein said first inlet portion of the periphery of said primary reaction chamber is on the opposite side of said primary reaction chamber from said second inlet portion of the periphery of said primary reaction chamber.

11. In a cyclic char fuel oxidation reactor plant as described in claim 5:

wherein said primary reactor pressure vessel container inlet and outlets are separate;

wherein said producer gas reservoir comprises an outlet separate from said inlet;

wherein said volatile matter in air mixture reservoir comprises an outlet separate from said inlet;

wherein said third reactant gas reservoir pressure vessel container comprises an outlet separate from said inlet;

a fixed open gas flow connection from said primary reactor pressure vessel container first outlet to said producer gas reservoir outlet and to said third reactant gas reservoir pressure vessel container separate outlet;

wherein each said secondary reactor pressure vessel container further comprises a second separate inlet connecting into said secondary reactor adjacent to said igniter means;

wherein each said primary reactor pressure vessel container comprises a second separate outlet;

wherein said second separate outlet of said primary reactor pressure vessel container has a fixed open gas flow connection only to said separate outlet of said volatile matter in air mixture reservoir;

first additional separate changeable gas flow connections, comprising means for opening and closing, from each said second separate outlet of each said primary reactor pressure vessel container to each said second separate inlet of each said secondary reactor pressure vessel container;

first additional control means for controlling said means for opening and closing said first additional separate changeable gas flow connections so that: said first additional changeable gas flow connections are opened and closed, concurrently for each said primary reactor, with those changeable gas flow connections from said primary reactor pressure vessel container first outlets to said first secondary reactor pressure vessel container inlets.

12. In a cyclic char fuel oxidation reactor plant as described in claim 11:

wherein said first inlet portion of the periphery of said primary reaction chamber is on the opposite side of primary reaction chamber from said second inlet portion of the periphery of said primary reaction chamber.

13. In a cyclic char fuel oxidation reactor plant as described in claim 7:

wherein said separate outlet of said producer gas reservoir further comprises a unidirectional flow means for permitting gas flow only out of said producer gas reservoir via said outlet.

14. In a cyclic char fuel oxidation reactor plant as described in claim 11:

wherein said separate outlet of said producer gas reservoir further comprises a unidirectional flow means for permitting gas flow only out of said producer gas reservoir via said outlet.

15. In a cyclic char fuel oxidation reactor plant as described in claim 1, wherein:

said producer gas reservoir comprising means for separating solid and liquid particles from said producer gas;

said ash removal mechanism means for removing ashes comprising means for removing collected solid and liquid materials from at least one of said ash collection end, said producer gas reservoir.

16. In a cyclic char fuel oxidation reactor plant as described in claim 3, wherein:

said producer gas reservoir comprises means for separating solid and liquid particles from said producer gas;

said ash removal mechanism, means for removing ashes comprises means for removing collected solid and liquid materials from at least one of said ash collection end, said producer gas reservoir.

17. In a cyclic char fuel oxidation reactor plant as described in claim 5, wherein:

said producer gas reservoir comprising means for separating solid and liquid particles from said producer gas;

said ash removal mechanism means for removing ashes comprising means for removing collected solid and liquid materials from at least one of said ash collection end, said producer gas reservoir.

18. In a cyclic char fuel oxidation reactor plant as described in claim 7, wherein:

said producer gas reservoir comprises means for separating solid and liquid particles from said producer gas;

said ash removal mechanism means for removing ashes comprises means for removing collected solid and liquid materials from at least one of said ash collection end, said producer gas reservoir.

19. In a cyclic char fuel oxidation reactor plant as described in claim 1:
    wherein said inlet of said second reactant gas manifold passes through said producer gas reservoir and is sealed therefrom.

20. In a cyclic char fuel oxidation reactor plant as described in claim 3:
    wherein said inlet of said second reactant gas manifold passes through said producer gas reservoir and is sealed therefrom.

21. In a cyclic char fuel oxidation reactor plant as described in claim 7:
    wherein said inlet of said second reactant gas manifold passes through said producer gas reservoir and is sealed therefrom.

* * * * *